(12) United States Patent
Chapman et al.

(10) Patent No.: US 12,446,818 B2
(45) Date of Patent: Oct. 21, 2025

(54) TECHNIQUES FOR IDENTIFYING AND ANALYZING EVENTS-OF-INTEREST INDICATED BY PHYSIOLOGICAL PARAMETERS

(71) Applicant: Stryker Corporation, Kalamazoo, MI (US)

(72) Inventors: Fred W. Chapman, Newcastle, WA (US); Robert G. Walker, Seattle, WA (US)

(73) Assignee: Stryker Corporation, Portage, MI (US)

( * ) Notice: Subject to any disclaimer, the term of this patent is extended or adjusted under 35 U.S.C. 154(b) by 467 days.

(21) Appl. No.: 17/949,080

(22) Filed: Sep. 20, 2022

(65) Prior Publication Data

US 2023/0090464 A1  Mar. 23, 2023

Related U.S. Application Data

(60) Provisional application No. 63/246,734, filed on Sep. 21, 2021.

(51) Int. Cl.
| | |
|---|---|
| *A61B 5/33* | (2021.01) |
| *A61B 5/00* | (2006.01) |
| *A61B 5/361* | (2021.01) |
| *A61B 5/363* | (2021.01) |
| *A61N 1/39* | (2006.01) |

(52) U.S. Cl.
CPC .............. *A61B 5/33* (2021.01); *A61B 5/361* (2021.01); *A61B 5/363* (2021.01); *A61B 5/742* (2013.01); *A61N 1/39044* (2017.08); *A61N 1/395* (2013.01)

(58) Field of Classification Search
None
See application file for complete search history.

(56) References Cited

U.S. PATENT DOCUMENTS

| 10,625,088 B1 | 4/2020 | Chapman et al. | |
| 2014/0358048 A1* | 12/2014 | Sullivan | A61H 31/005 601/41 |
| 2021/0220660 A1* | 7/2021 | Danziger | A61N 1/3987 |

OTHER PUBLICATIONS

Frigerio, et al., "End-Tidal Carbon Dioxide (ETCO2) and Ventricular Fibrillation Amplitude Spectral Area (AMSA) for Shock Outcome Prediction in Out-of-Hospital Cardiac Arrest. Are They Two Sides of the same Coin?", Resuscitation, vol. 160, Mar. 2021, pp. 142-149.

Kingsley, et al., "Out-of-Hospital Resuscitation of a 3 Month Old Boy Presenting with Recurrent Ventricular Fibrillation Cardiac Arrest: A Case Report," Scandinavian Journal of Trauma, Resuscitation and Emergency Medicine, vol. 29, Article No. 58, Apr. 2021, pp. 1-6.

* cited by examiner

Primary Examiner — Ankit D Tejani
(74) Attorney, Agent, or Firm — Lee & Hayes, P.C.

(57) ABSTRACT

Various techniques related to post-treatment parameters of patients are described. An example method includes identifying a segment of an electrocardiogram (ECG) of an individual, wherein the segment is detected during a time interval that begins when an electrical shock is output to the individual's heart. The method further includes identifying a parameter of the electrical shock and generating a report including the segment of the ECG and indicating the parameter of the electrical shock. The report is output or transmitted to an external device.

20 Claims, 7 Drawing Sheets

TECHNIQUES FOR IDENTIFYING AND ANALYZING EVENTS-OF-INTEREST INDICATED BY PHYSIOLOGICAL PARAMETERS

CROSS-REFERENCE TO RELATED APPLICATION

This application claims the priority of U.S. Provisional App. No. 63/246,734, which was filed on Sep. 21, 2021 and is incorporated by reference herein in its entirety.

BACKGROUND

Cardiac arrhythmias are a leading cause of death and even when not fatal, often cause significant damage to a patient's health. Many patients experience cardiac arrhythmias outside of a hospital, that is in a "pre-hospital" environment. When these pre-hospital cardiac events occur, emergency medical systems (EMS) teams are often dispatched to the location of the patient to monitor and treat the patient according to a set of resuscitation guidelines, such as those issued by the American Heart Association (AHA), until the patient is considered stabilized for transport to a medical facility.

EMS teams typically bring medical devices like monitor-defibrillators to help monitor and treat patients in the field during these cardiac events. The monitor-defibrillators monitor the patient's vital signs and deliver treatments, when needed, such as defibrillation. A monitor-defibrillator either delivers the defibrillation shock automatically or outputs a prompt for EMS personnel to manually trigger shock delivery using the device.

When a patient is in such cardiac distress, however, the patient's heart may be unable to effectively pump oxygenated blood through the patient's body, which can damage the patient's brain and other vital organs. This damage can be reduced or prevented by performing cardiopulmonary resuscitation (CPR). Chest compressions administered during CPR help to propel oxygenated blood to the patient's brain and other vital organs in lieu of the patient's heart. Current resuscitation guidelines require or highly recommend that CPR begin immediately after defibrillation shock delivery and continue for 2 minutes. Current resuscitation guidelines also require or highly recommend that rescuers perform the full period of CPR after delivery of a defibrillation shock before pausing chest compressions for re-evaluation the electrical activity of the patient's heart.

DETAILED DESCRIPTION

Figure 1:
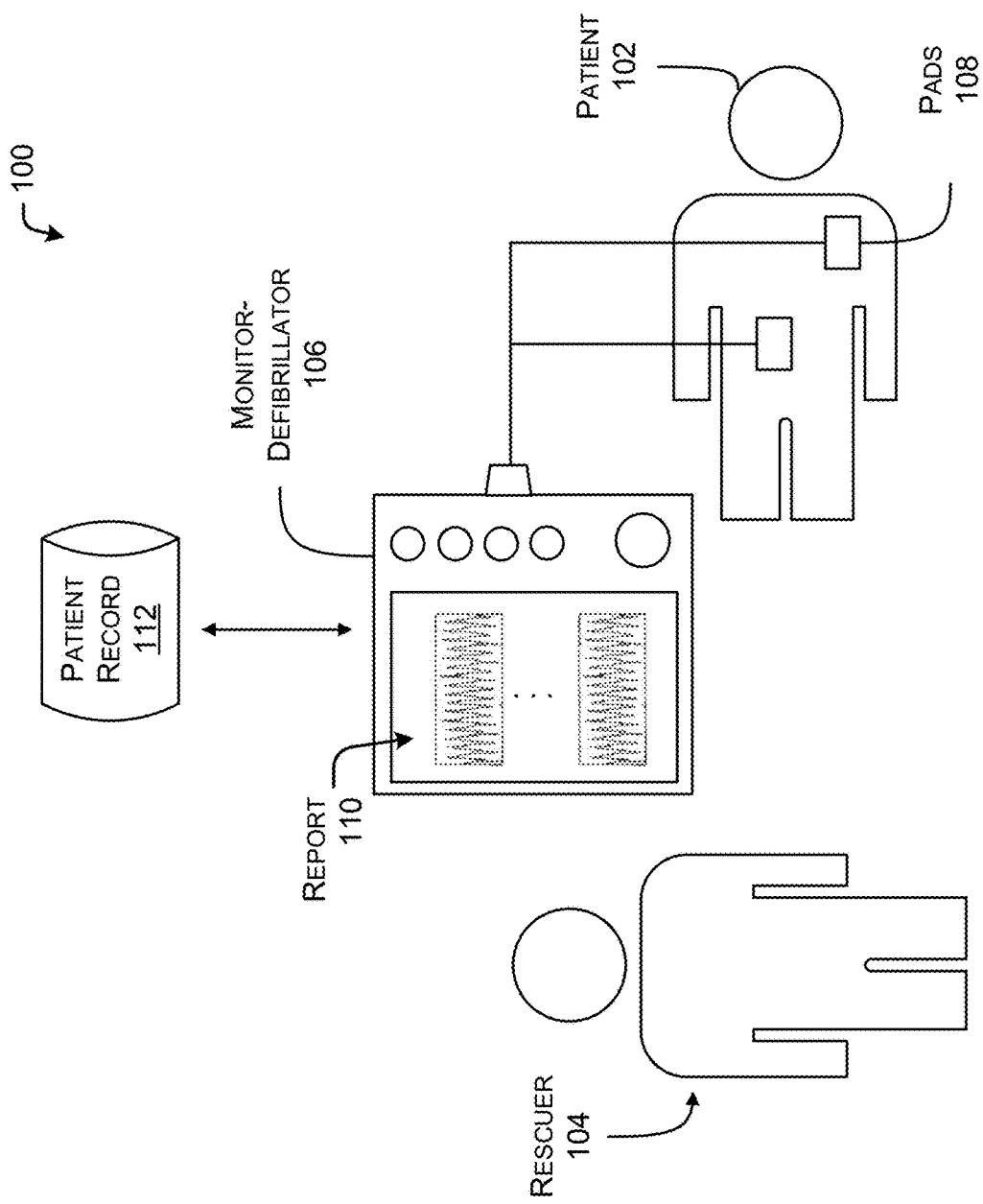
FIG. 1 illustrates an example environment for outputting a report of post-shock behavior of a patient.

Current resuscitation guidelines instruct care providers (e.g., EMS teams, nurses, doctors, bystanders, or the like) to administer CPR to a patient continuously for a time period (e.g., 2 minutes) after the patient is treated with a defibrillation shock. Once the CPR time period expires, a heart rhythm of the patient is reevaluated to determine whether a shockable arrhythmia persists. If the shockable arrhythmia is present after CPR is administered, then the patient is treated with another defibrillation shock. In various cases, an energy level of each defibrillation shock is escalated (e.g., increased), with the assumption that the patient's shockable arrhythmia was not responsive to the previous defibrillation shock. In other cases, additional decisions about treatment provided to the patient are based on the assumption that the patient's shockable arrhythmia was not responsive to the previous defibrillation shock.

In some cases, a previous defibrillation shock temporarily resolves the shockable arrhythmia of the patient. By the time the CPR period ends, however, the shockable arrhythmia has returned. If the heart rhythm is only assessed at the end of the CPR period, at which point the shockable arrhythmia is exhibited, then the care providers are unaware that the previous defibrillation shock was successful, albeit temporarily, at accomplishing the goal of a defibrillation shock—namely termination of the shockable arrhythmia. In this circumstance, because the temporary success of the previous defibrillation shock remains unknown, the energy level of the subsequent defibrillation shock could be unnecessarily escalated, and/or additional decisions about treatment provided to the patient could be made based upon an inaccurate perception of the response of the patient's heart to the previous defibrillation shock. This problem can be addressed by assessing the cardiac rhythm of the patient immediately after a defibrillation shock, and selectively modifying a parameter of a subsequent defibrillation shock, and/or modifying a subsequent treatment process, based on the cardiac rhythm of the patient exhibited promptly after the previous defibrillation shock.

In various implementations of the present disclosure, measurements obtained shortly after an initial treatment are analyzed to determine whether the initial treatment was at least temporarily effective. According to some examples, a report indicating a patient's condition immediately after the treatment is generated and output to a user. In some instances, the report indicates the patient's condition immediately after each of multiple treatments administered to the patient. Accordingly, the user may effectively analyze the patient's condition and treatment over time.

In some cases, the parameter is automatically adjusted. If the initial treatment was at least temporarily effective, a subsequent treatment with a same parameter as the initial treatment is administered. On the other hand, if the initial treatment was ineffective, the subsequent treatment is associated with a different parameter than the parameter of the initial treatment. If the initial treatment was ineffective, an instruction to modify an output device administering the treatment is output to a user, thereby modifying administration of the subsequent treatment.

Various implementations of the present disclosure provide improvements to the field of medical device technology, such as the field of defibrillation technology. Technologies that only consider ECG data obtained well after the initial shock (e.g., over 30 seconds, over a minute, or the like) are unable to assess whether an initial shock is at least temporarily effective in treating a shockable arrhythmia. As a result, these technologies may automatically escalate an energy level of a subsequent shock, even though shockable arrhythmia was treatable by the lower energy level of the initial shock. In various examples of the present disclosure, the unnecessary escalation of energy in the subsequent shock, and/or the unnecessary triggering of additional or alternate treatment processes, can be avoided when the initial shock is determined to be at least temporarily effective in treating the shockable arrhythmia. Accordingly, the shockable arrhythmia of the patient can be treated, and harm from unnecessary treatments or care processes that could occupy time and resources, and could unnecessarily disrupt legitimate treatment priorities, can be minimized or prevented.

Various implementations disclosed herein also improve defibrillation efficacy. By evaluating ECG data soon after administration of an initial shock, some example systems are able to determine that the initial shock was ineffective. As a result, the administration of the subsequent shock can be modified, such as by instructing a user to adjust hardware that administers the subsequent shock, or by changing a parameter of the subsequent shock. These modifications increase the likelihood that the non-shockable rhythm is treated effectively and efficiently.

Various implementations of the present disclosure will now be described with reference to the accompanying figures.

FIG. 1 illustrates an example environment 100 for outputting a report of post-shock behavior of a patient 102. As shown, the environment 100 includes a rescuer 104 treating and/or assessing the condition of the patient 102. The rescuer 104 treats and/or assesses the condition of the patient 102 by operating a monitor-defibrillator 106. In various implementations, the monitor-defibrillator 106 generates and outputs a report indicating how the patient 102 has reacted to individual electrical shocks administered using the monitor-defibrillator 106.

In particular implementations, the patient 102 is an individual (e.g., a human being) in medical distress. In some cases, the patient 102 has lost consciousness. For instance, the patient 102 is experiencing an abnormal heart rhythm (also referred to as an "arrhythmia"), such that the heart of the patient 102 is incapable of providing sufficient oxygenation to the brain and/or other vital organs of the patient 102. The rescuer 104, in various cases, is a bystander, an emergency medical technician (EMT), a paramedic, a nurse, a physician, or some other type of operator. In some cases, the monitor-defibrillator 106 is embodied in a single device at an emergency scene of the patient 102. In some examples, the monitor-defibrillator 106 is embodied in multiple devices, one of which may be located at the scene of the patient 102, one of which may be located remotely from the scene (e.g., in a remote server communicating with a device at the scene over a communication network), or both.

In various implementations, the monitor-defibrillator 106 is connected to pads 108 affixed to the chest of the patient 102. In various cases, the monitor-defibrillator 106 is an external defibrillator, such that the pads 108 are attached to the skin of the patient 102. The pads 108 include, for example, electrocardiogram (ECG) electrodes and defibrillation electrodes. The monitor-defibrillator 106 includes a detection circuit configured to detect a current, voltage, and/or electrical impedance between at least one pair of the ECG electrodes. The monitor-defibrillator 106 detects an ECG of the patient 102 based on the current and/or voltage. The ECG is indicative of the electrical activity of the patient's 102 heart. In addition, the monitor-defibrillator 106 detects chest compressions administered to the patient 102 (e.g., by the rescuer 104 or by a mechanical chest compression device) based on the impedance.

According to some examples, the patient 102 is receiving the chest compressions while the ECG is being detected. The chest compressions generate an artifact in the ECG. In some cases, the monitor-defibrillator 106 removes the artifact from the ECG. Some examples utilize technologies such as cprINSIGHT™ Analysis Technology from Stryker Corporation of Kalamazoo, Mich., which at least partially filters (e.g., detects and compensates for) an artifact associated with chest compressions from the ECG signal. Thus, the heart rhythm of the patient 102 is discernible even when the patient 102 is receiving chest compressions.

In some cases, the ECG of the patient 102 indicates that the heart of the patient 102 is exhibiting an arrhythmia that is treatable by defibrillation (also referred to as a "shockable rhythm"), such as ventricular fibrillation (VF or V-Fib) or pulseless ventricular tachycardia (VT or V-Tach). As used herein, the term "pulseless" can refer to the state of an individual who does not have discernible blood flow in an extremity, regardless of the electrical activity in the individual's heart. Defibrillation is not indicated for other types of heart rhythms, such as normal sinus rhythms (e.g., rhythms including a QRS complex) and non-VF or non-VT arrhythmias (e.g., atrial fibrillation, pulseless electrical activity, or asystole). In some cases, the monitor-defibrillator 106 identifies an arrhythmia that is treatable by defibrillation in the ECG of the patient 102. For example, the monitor-defibrillator 106 identifies VF or VT in a segment of the ECG.

The monitor-defibrillator 106 is further configured to administer an electrical shock to the patient 102 (also referred to as a "defibrillation shock") via the defibrillation electrodes in the pads 108. For example, the monitor-defibrillator 106 includes a discharge circuit including a chargeable capacitor that is configured to discharge a stored voltage to the defibrillation electrodes. In some examples, the electrical shock at least temporarily resolves the arrhythmia of the patient 102. The electrical shock is defined according to at least one parameter. A parameter includes, for instance, a voltage amplitude of the electrical shock, a shock vector of the electrical shock (e.g., a direction at which the electrical shock is applied), a number of shocks applied, a time interval between multiple shocks applied, a selection of two electrodes from which to apply the shock among more than two electrodes applied to the patient 102, an energy level of the electrical shock, a duration of the electrical shock, a shape of the electrical shock (e.g., defined as a plot of voltage in the time and/or frequency domains), or a type of the electrical shock (e.g., monophasic or biphasic).

According to some implementations, the patient 102 receives a treatment including the electrical shock from the monitor-defibrillator 106, the rescuer 104, another device (e.g., a mechanical chest compression device, such as LUCAS™ 3 from Stryker Corporation of Kalamazoo, Mich.), or any combination thereof. A parameter of the treatment may include the parameter of the electrical shock and/or another type of parameter. For example, if the patient 102 is treated with chest compressions, a parameter of the treatment includes a frequency of the chest compressions, a depth of the chest compressions, a duration of the chest compressions, or a characteristic (e.g., a frequency or duration) of a pause in chest compressions administered to the patient 102 (e.g., a pause during one or more electrical shocks administered to the patient 102 or a pause after one or more electrical shocks are administered to the patient 102). In some examples, the patient 102 is treated with positive pressure ventilation, such as by a mechanical ventilator or bag-valve mask operated by the rescuer 104. When the patient 102 is treated with positive pressure ventilation, a parameter of the treatment may include a ventilation frequency, a ventilation volume, a ventilation flow rate, or a characteristic (e.g., a frequency or duration) of a pause in ventilation (e.g., a pause during one or more electrical shocks administered to the patient 102 or a pause after one or more electrical shocks are administered to the patient 102). Other treatment parameters include whether a medication was administered to the patient 102, whether the medication was withheld, a timing or destination of transportation of the patient 102 to a care facility (e.g., a hospital), whether other treatment protocols (e.g., activation of transport to a catheterization laboratory, activation of resuscitative extracorporeal membrane oxygenation (ECMO) are activated, or a timing at which other treatment protocols are activated.

In particular cases, the arrhythmia of the patient 102 is unresolved by a single electrical shock. For example, the electrical shock may be insufficient to even briefly resolve the arrhythmia of the patient 102 (referred to as a "refractory arrhythmia") or the electrical shock only temporarily resolves the arrhythmia of the patient 102 before the arrhythmia restarts (referred to as a "recurrent arrhythmia"). If the electrical shock does not resolve the arrhythmia of the patient 102, even temporarily, then a change in the treatment of the patient 102 may be indicated. However, if the electrical shock temporarily resolves the arrhythmia, then the arrhythmia may respond to the same type of treatment that was administered, and a change in the treatment may not be warranted.

Various implementations of the present disclosure facilitate distinguishing between a refractory arrhythmia and a recurrent arrhythmia. In particular examples, the monitor-defibrillator 106 identifies a segment of the ECG of the patient 102 that is detected after administration of an electrical shock to the patient 102. For example, the segment begins within 15, 10, 5, or 3 seconds after electrical shock delivery and ends within 60, 50, 40, 30, 20, 10, or 5 seconds of the electrical shock delivery. In cases in which the segment is detected as the patient 102 is receiving chest compressions, the monitor-defibrillator 106 removes an artifact associated with the chest compressions from the segment. The rescuer 104, for instance, refrains from pausing chest compressions for post-shock analysis. Accordingly, the segment indicates whether the patient 102 has the arrhythmia even if the segment is detected during chest compressions.

According to some instances, the monitor-defibrillator 106 generates a report 110 based on the segment. For example, the report 110 includes a waveform of the segment. In some cases, the report 110 further indicates one or more parameters of the electrical shock administered immediately before the segment was detected. For instance, the report 110 includes a voltage amplitude of the electrical shock, an energy level of the electrical shock, a power of the electrical shock, a duration of the electrical shock, a shape of the electrical shock, or whether the electrical shock is monophasic or biphasic. Other details are further included in the report 110, in some cases. These other details include a counter corresponding to the electrical shock (e.g., "2" for the second electrical shock administered to the patient 102), a time of the electrical shock (e.g., a timestamp at which the electrical shock was initiated), a length of a pre-shock pause (e.g., a length of time that begins with a time at which chest compressions cease and ends when the electrical shock is administered), a length of a post-shock pause (e.g., a length of time that begins when the electrical shock is administered and ends when chest compressions resume), or a length of a peri-shock pause (e.g., a length of time that begins with a time at which chest compressions cease and ends when chest compressions resume after shock delivery). The report 110 can specify any parameter of the electrical shock and/or overall treatment administered to the patient 102. The report 110 is output by the monitor-defibrillator 106, such as visually on a screen of the monitor-defibrillator 106, and/or transmitted to an external device. In some cases, the external device outputs the report 110, such as during post-event review.

By including the post-shock segment and the additional details about the electrical shock administered to the patient 102, the report 110 efficiently communicates whether the electrical shock even temporarily resolved the arrhythmia of the patient 102. Thus, the rescuer 104 is able to efficiently identify whether the patient 102 is experiencing a refractory or a recurrent arrhythmia. As a result, the rescuer 104 is able to efficiently and intelligently determine whether to adjust a parameter of the electrical shock (e.g., in the case of a refractory arrhythmia) or whether to maintain the parameter of the electrical shock during subsequent treatment of the patient 102 (e.g., in the case of a recurrent arrhythmia). The rescuer 104 is also able to efficiently and intelligently determine whether to adjust any other treatments or procedures delivered to the patient, such as whether to adjust a parameter of chest compressions, positive pressure ventilation, medications, or other treatment protocols administered to the patient 102. Various techniques described herein optimize the treatment of the patient 102 and also prevent unnecessarily increasing the energy of the electrical shock when the arrhythmia is treatable by a lower-energy electrical shock.

According to some implementations, the report 110 includes segments and details associated with multiple electrical shocks administered to the patient 102 during a rescue event. In some implementations, the segments are vertically aligned, such that the beginning of each segment is aligned on the same vertical line. Due to this visual alignment, the rescuer 104 is able to easily compare the different electrical shocks administered to the patient 102, in order to holistically identify any deficiencies in previous treatments administered to the patient 102. The rescuer 104 is able to modify the parameters of the treatment accordingly.

In some cases, the monitor-defibrillator 106 automatically analyzes a segment in order to recognize whether the segment is indicative of a refractory arrhythmia or a recurrent arrhythmia. In various implementations, the monitor-defibrillator 106 determines whether at least a portion of the post-shock segment of the ECG has characteristics (e.g., in the frequency spectrum) that are consistent with VF or VT, or some other heart rhythm that is not treatable by defibrillation. In various implementations, the monitor-defibrillator 106 outputs an indication that the segment exhibits a refractory arrhythmia or a recurrent arrhythmia. In some examples, the monitor-defibrillator 106 transmits, to the external device, a signal indicating that the segment exhibits the refractory arrhythmia or the recurrent arrhythmia.

In particular cases, the monitor-defibrillator 106 outputs an instruction to the rescuer 104 based on the segment. For example, the monitor-defibrillator 106 outputs an instruction to change a parameter of the next electrical shock or treatment administered to the patient 102 based on the segment (e.g., when the segment exhibits a refractory arrhythmia). For example, the instruction directs the rescuer 104 to change a voltage amplitude of the electrical shock, an energy level of the electrical shock, a duration of the electrical shock, a number of electrical shocks administered to the patient 102, a power level of the electrical shock, a shape of the electrical shock, a vector of the electrical shock (e.g., to select a different pair of electrodes applied to the patient 102 or to change the placement of electrodes applied to the patient 102, or a type of the electrical shock (e.g., monophasic or biphasic). In some examples, the monitor-defibrillator 106 outputs an instruction to maintain a parameter of the next electrical shock administered to the patient 102 based on the segment (e.g., when the segment exhibits a recurrent arrhythmia). For instance, if the monitor-defibrillator 106 determines that a previous electrical shock has not even temporarily terminated the shockable arrhythmia of the patient 102, the instruction directs the rescuer 104 to administer a next electrical shock with a greater voltage, energy, duration, a different vector, or as a different type than the previous electrical shock.

In some implementations, the instruction may direct the rescuer 104 to (or the monitor-defibrillator 106 may automatically) administer multiple electrical shocks to the patient 102 if the previous electrical shock has not even temporarily terminated the shockable arrhythmia of the patient 102. For instance, the monitor-defibrillator 106 includes multiple energy storage mechanisms (e.g., multiple storage capacitors) configured to administer respective electrical shocks to the patient 102, or the monitor-defibrillator 106 communicates with another defibrillator such that the monitor-defibrillator 106 and the other defibrillator administer the electrical shocks to the patient 102 in a coordinated manner. In some cases, a first electrical shock is administered less than 5 seconds and greater than 1 millisecond (ms) before a second electrical shock. For example, a time interval between the first electrical shock and the second electrical shock is greater than or equal to 10 ms and less than or equal to 125 ms. In some cases, the first electrical shock and the second electrical shock are administered at overlapping time intervals.

According to some implementations, the monitor-defibrillator 106 automatically adjusts a parameter of the next electrical shock administered to the patient 102 based on the segment. For instance, upon identifying that the segment exhibits refractory arrhythmia, the monitor-defibrillator 106 automatically increases a voltage amplitude, an energy level, a duration, a power of the next electrical shock administered to the patient 102 and/or changes a shape of the electrical shock or a type of the electrical shock (e.g., either monophasic or biphasic). Thus, the monitor-defibrillator 106 optimizes the treatment to the patient 102 based on the reaction of the patient 102 to a previous treatment.

In various implementations, the monitor-defibrillator 106 stores data corresponding to the ECG, the electrical shock, and/or the report 110 in a patient record 112. In some cases, the patient record 112 is stored in memory of the monitor-defibrillator 106 and/or a memory contained within the electrodes of the monitor-defibrillator 106. In some examples, the patient record 112 is stored in a device that is external to the monitor-defibrillator 106, and the monitor-defibrillator 106 (or at least one electrode) transmits the data to the device storing the patient record 112 over one or more communication networks (e.g., wireless networks, the Internet, or the like). In various cases, the patient record includes a database. In some cases, the patient record 112 stores the data in an electronic medical record (EMR). The monitor-defibrillator 106, for example, stores times at which the electrical shock is output to the pads, data points representing the ECG, parameters (e.g., energy levels) of the electrical shock, and/or indications of whether the electrical shock at least temporarily resolved the shockable arrhythmia of the patient 102. In particular embodiments, information regarding patient history can be reported and/or stored as a number of ECG clips, and optionally including time-aligned impedance signal segments, that can be used to visually determine shockable arrhythmia termination or lack thereof. Accordingly, clinical providers reviewing the data stored in the patient record 112 are able to identify what types of treatments were performed on the patient 102 using the monitor-defibrillator 106 and whether those treatments were successful. Clinical providers are able to use the patient record 112 to make more informed clinical decisions about future care of the patient 102. For example, the patient record 112 is stored in Code-Stat™ (Physio-Control, Inc., Redmond, WA).

Although FIG. 1 is described with reference to identifying arrhythmias in ECG signals, implementations are not so limited. In various examples, the monitor-defibrillator 106 is configured to identify another type of recurrent event-of-interest by analyzing the ECG or some other physiological parameter, detected by the monitor-defibrillator 106, or in some other signal from a sensor connected to or in communication with the monitor-defibrillator 106. Examples of other physiological parameters include, for instance, a movement (e.g., acceleration) of the patient 102, a capnograph of the patient 102, an end-tidal $CO_2$ ($EtCO_2$) of the patient 102, a partial pressure of $O_2$ in the airway of the patient 102, a flow rate of air through the airway of the patient 102, a tidal volume of the patient 102, a blood oxygenation of the patient 102 (e.g., an $spO_2$ or $rSO_2$ waveform of the patient 102), a blood pressure of the patient 102, an electroencephalogram (EEG) of the patient 102, a heart rate of the patient 102, a pulse rate of the patient 102, an impedance (e.g., a transthoracic impedance) of the patient 102, and a temperature of the patient 102 (e.g., a core temperature of the patient 102). In some cases, the monitor-defibrillator 106 includes one or more sensors configured to detect one or more of the other physiological parameters, such as an accelerometer, a $CO_2$ sensor, a flow sensor, an oxygenation sensor, a blood pressure cuff, an ultrasound transducer, at least one EEG electrode, or a thermometer.

In various implementations, the monitor-defibrillator 106 is configured to detect a repeated events-of-interest based on a physiological parameter of the patient 102 over time. The event-of-interest, for example, may be a predetermined shape of a waveform of the physiological parameter over time, an instance of the physiological parameter crossing a threshold, or some other clinically relevant event. In some instances, the event-of-interest is an abrupt, sizeable change in heart rate (e.g. changes by >20 bpm in <5 seconds). In particular examples, the event-of-interest is defined when capnograph and/or $EtCO_2$ of the patient 102 is less than a threshold. In some instances, the event-of-interest is defined when the patient 102 stops breathing, which can be indicated by the capnograph, $EtCO_2$, transthoracic impedance, partial pressure of $O_2$, respiratory flow rate, or respiratory tidal volume of the patient 102. In some cases, the event-of-interest is administration of a medication (e.g., adrenaline, a sedative, etc.), which can result in a corresponding change to the physiological parameter. For example, if the medication is a sedative, the administration of the sedative can be identified based on a slowing or stopping of the breathing of the patient 102 (e.g., as indicated by the capnograph, $EtCO_2$, partial pressure of $O_2$, flow rate, or tidal volume of the patient 102) or based on the heart rate of the patient 102 being lower than a threshold (e.g., as indicated by the ECG, pulse rate, or heart rate of the patient 102). According to some examples, the event-of-interest is a return of spontaneous circulation (ROSC), which can be detected based on the pulse rate or blood pressure of the patient 102. In some examples, the event-of-interest is a seizure, which is identified based on a particular shape of the EEG of the patient 102, or a pattern of artifact in the ECG of the patient 102, or a pattern in the signal from an accelerometer attached to the patient. According to particular instances, the event-of-interest is the start or end of chest compressions administered to the patient 102, which can be identified based on a pattern in the transthoracic impedance of the patient 102, or a signal from a mechanical CPR device performing chest compressions on the patient 102, or from a chest compression sensor in contact with or adjacent to the hands of the care provider performing chest compressions on the patient 102. Although several events-of-interest are described herein, the monitor-defibrillator 106 may be configured to detect other clinically relevant events-of-interest that are not specifically described herein, and may be configured to perform these detections via other means that are not specifically described herein.

Various types of recognized events-of-interest are possible. Events-of-interest, for instance, include treatments administered to the patient 102. In some cases, the monitor-defibrillator 106 keeps track of an event-of-interest that it performs on the patient 102, such as an electrical shock, a rhythm analysis, an alarm, or a marker event (e.g., the rescuer provides an input signal to the monitor-defibrillator 106 that causes the monitor-defibrillator 106 to transmit or store data indicative of the time of the input signal and/or other details about the input signal, such as whether the input signal indicates that a particular medication has been administered to the patient 102 at the time). In some examples, the event-of-interest happens externally to the monitor-defibrillator 106, such as a non-physiological signal. For instance, the monitor-defibrillator 106 detects a predetermined word or phrase in audio recording (e.g., using voice recognition) or a predetermined object or characteristic in an image or video detected by a camera of the monitor-defibrillator 106 or a connected device (e.g., a characteristic change in ambient light pattern/quality in video from a communicatively coupled video laryngoscope indicative of the laryngoscope entering the mouth of the patient 102 or a medication vial label indicating a particular medication is being delivered to the patient 102).

According to some examples, the monitor-defibrillator 106 identifies at least one segment of a physiological parameter based on the detected event-of-interest. In some cases, the event-of-interest is identified based on a first physiological parameter and the segment indicates a second physiological parameter that is different than the first physiological parameter. In some instances, the segment is of the same parameter used to identify the event-of-interest. For example, a beginning or ending of the segment is defined based on the time at which the event-of-interest is detected in the physiological parameter. In some cases, the beginning or ending of the segment is defined earlier or later than the time of the event-of-interest by a particular time period, such as 1 second, 5 seconds, 10 seconds, or 30 seconds earlier or later than the event-of-interest. In various implementations, the monitor-defibrillator 106 generates the report 110 to include the detected segment(s).

In some instances, the monitor-defibrillator 106 detects multiple instances of a given event-of-interest that is indicated by a physiological parameter. For example, the monitor-defibrillator 106 detects multiple instances of seizures in the EEG of the patient 102. The monitor-defibrillator 106 identifies multiple segments respectively corresponding to the multiple instances of the event-of-interest. In some examples, the monitor-defibrillator 106 includes the multiple segments in the report 110. According to some examples, multiple segments are vertically aligned in the report 110.

In some instances, the monitor-defibrillator 106 determines, or facilitates determination by the rescuer 104, of whether the patient 102 has a return of spontaneous circulation (ROSC). The monitor-defibrillator 106 detects multiple instances of the cessation of chest compressions administered to the patient 102. For instance, the monitor-defibrillator 106 determines when a transthoracic impedance of the patient 102 ceases to exhibit a periodic signal indicative of chest compressions. The monitor-defibrillator 106 extracts segments of a physiological parameter (e.g., partial pressure of $CO_2$ in the airway of the patient 102, $EtCO_2$, arterial blood pressure, cerebral oximetry, magnitude of impedance oscillations, magnitude of photoplethysmography oscillations, oximetry, etc.) that respectively begin simultaneously with the instances at which the chest compressions cease. In some cases, the monitor-defibrillator 106 displays the segments. If the patient 102 does not have spontaneous circulation, the segments of the physiological parameter indicate worsening of the condition of the patient 102 over time. For instance, the arterial blood pressure and oximetry levels would decrease across the segments. In contrast, if the patient 102 has spontaneous circulation, the segments of the physiological parameter indicate that the condition of the patient 102 is being maintained or is improving.

Particular examples of modified treatment parameters will now be described. For instance, a parameter of a subsequent electrical shock is modified based on the response of the patient 102 to an earlier electrical shock. In some examples, if the shockable arrhythmia of the patient 102 was not resolved, even temporarily, by the earlier electrical shock, the monitor-defibrillator 106 may (compared to the earlier electrical shock) increase the energy level of the subsequent electrical shock, change a shock vector of the subsequent electrical shock, deliver the subsequent electrical shock simultaneously or near-simultaneously with another defibrillator (also referred to as double-sequential defibrillation), change a time interval between individual pulses within the subsequent electrical shock, or select a different pair of electrodes to administer the subsequent electrical shock.

In some examples, the monitor-defibrillator 106 causes modification of a parameter of chest compressions and/or positive pressure ventilation administered to the patient 102. For instance, the monitor-defibrillator 106 causes modification of the parameter by outputting an instruction to the user 104 and/or a signal to a mechanical chest compression device. In some cases, if the shockable arrhythmia of the patient 102 was not resolved, even temporarily, by the earlier electrical shock, the monitor-defibrillator 106 causes a pause in chest compressions and/or a pause in positive pressure ventilation during the subsequent shock. If, however, the shockable arrhythmia was at least temporarily resolved by the earlier electrical shock, the monitor-defibrillator 106 causes a delay in resuming chest compressions after the subsequent shock. In some cases, the monitor-defibrillator 106 causes administration of a medication (e.g., epinephrine), withholding of a medication, transport of the patient 102 to a care facility, activation of a catheterization laboratory, or activation of ECMO, depending on whether the monitor-defibrillator 106 determines whether the earlier electrical shock at least temporarily resolved the shockable arrhythmia.

In some implementations, the monitor-defibrillator detects and/or administers one or more treatments to the patient 102. According to some cases, the monitor-defibrillator 106 detects a pre-treatment segment of the physiological parameter and a post-treatment segment of the physiological parameter. In some cases, the monitor-defibrillator 106 determines, by analyzing the pre-treatment segment, whether the physiological parameter is indicative of a condition that is addressable by a treatment. For instance, the monitor-defibrillator 106 determines whether a shockable arrhythmia is indicated in a pre-shock ECG segment of the patient 102. In various cases, the monitor-defibrillator 106 determines, by analyzing the post-treatment segment, whether the condition has been resolved. In some cases, the condition is not indicated in an initial portion of the post-treatment segment, but then is indicated in a latter portion of the post-treatment segment. That is, the monitor-defibrillator 106 may infer that the treatment temporarily resolved the condition. In these cases, the monitor-defibrillator 106 may recommend that the treatment be readministered to the patient 102 at one or more same treatment parameters. For instance, the monitor-defibrillator 106 may recommend that a shock be readministered at the same energy level. If, however, the monitor-defibrillator 106 determines that the condition remains indicated in the post-treatment segment immediately after the treatment is administered, the monitor-defibrillator 106 may recommend an escalation of the treatment. For instance, the monitor-defibrillator may recommend that a shock be administered at a higher energy level than a previous shock administered to the patient 102.

In some cases, the monitor-defibrillator 106 determines, by analyzing the pre-treatment segment, that the treatment was not indicated. For instance, the monitor-defibrillator 106 may determine that there is an absence of a shockable arrhythmia in a pre-shock ECG segment. In some implementations, the monitor-defibrillator 106 outputs an indication that the treatment was not indicated to the user 104.

In various examples, multiple treatments are administered to the patient 102 over time. For instance, the patient 102 may have a shockable arrhythmia, the monitor-defibrillator 106 may administer an electrical shock to the patient 102, the electrical shock may temporarily resolve the shockable arrhythmia, but the patient 102 may subsequently acquire the shockable arrhythmia once more (e.g., the patient 102 may refibrillate after being defibrillated). In some cases, the monitor-defibrillator 106 may detect and/or administer two, three, four, five, or more treatments to the patient 102. In various cases, the monitor-defibrillator 106 outputs a report summarizing the condition of the patient 102 and/or the treatments administered to the patient 102.

Although various implementations are described with respect to the monitor-defibrillator 106, implementations are not so limited. For example, one or more of the functions described herein can be performed by a medical device without a defibrillation capability or a computing device (e.g., a mobile phone, tablet computer, laptop, etc.). Furthermore, in some implementations, various functions described with respect to FIG. 1 are performed by a computing device (not illustrated) connected between the monitor defibrillator 106 and the pads 108. The computing device, for instance, receives electrical signals indicative of the ECG of the patient 102 from the pads 108 and is configured to remove a chest compression artifact from the ECG. In some cases, the computing device further includes a screen or other output device configured to output the ECG (with or without the chest compression artifact removed) and/or recommendations to the rescuer 104.

Figure 2A:
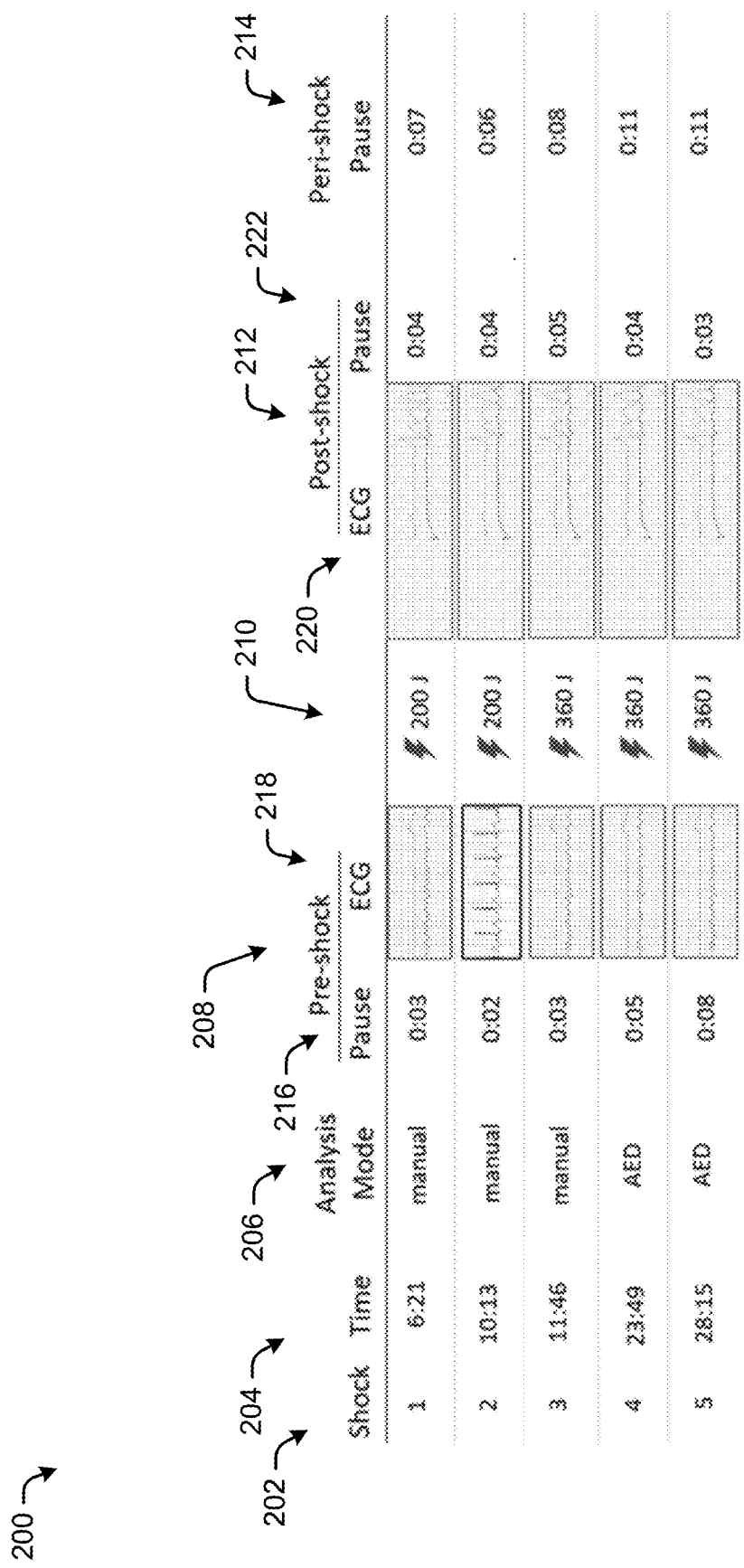
FIG. 2A illustrates an example of a report summarizing the results of multiple electrical shocks administered to a patient during a rescue event.

FIG. 2A illustrates an example of a report 200 summarizing the results of multiple electrical shocks administered to a patient during a rescue event. The report 200 illustrated in FIG. 2A includes a shock number column 202, a time column 204, an analysis mode column 206, a pre-shock column 208, a shock parameter column 210, a post-shock column 212, and a peri-shock column 214.

The shock number column 202 indicates the order at which each of the electrical shocks was administered to the patient. A total of five electrical shocks were administered to the patient, and thus the shock number column 202 includes labels 1-5. Each row of the report 200 corresponds to a different shock administered to the patient during the rescue event.

The time column 204 indicates the times at which the electrical shocks were administered to the patient. For example, the first electrical shock was administered at time "6:21" and the second electrical shock was administered at time "10:13." In some cases, the time is measured in minutes and/or seconds. The time, for example, is measured from a time at which the device generating the report 200 is active (e.g., a start-up time of the device).

The analysis mode column 206 indicates the types of defibrillation modes that the device was operating in when the electrical shocks were administered. For example, the device is configured to operate in a manual mode and an AED mode. In the manual mode, the device administers an electrical shock based on input from a user. For example, the device displays the ECG to the user, the user inputs a parameter of the electrical shock and an indication of when the electrical shock is to be administered to the patient, and the device administers the electrical shock accordingly. In the AED mode, the device analyzes the ECG of the patient and determines the parameter and timing of the electrical shock based on the analysis.

The pre-shock column 208 includes two sub-columns: a pause column 216 and an ECG column 218. The pause column 216 indicates a length of a chest compression pause that occurred prior to each electrical shock. For example, a rescuer administering chest compressions to the patient paused the chest compressions five seconds prior to the fourth electrical shock. The ECG column 218 shows segments of the ECG of the patient that were detected within a threshold time period prior to the electrical shocks. In some cases, the ECG column 218 illustrates 3-, 5-, or 10-second segments of the ECG of the patient. In some cases each segment illustrated in the ECG column 218 has the same length. Furthermore, the segments of the ECG column 218 are vertically aligned with one another in the report 200.

The shock parameter column 210 indicates the conditions of the electrical shocks administered to the patient. In the report 200 illustrated by FIG. 2A, the energy levels of the respective electrical shocks are displayed in the shock parameter column 210. For example, the third electrical shock was administered with an energy of 360 J. Optionally, another parameter is included with or in lieu of the energy level settings of the electrical shocks. For example, the shock parameter column 210 optionally indicates a voltage amplitude of each electrical shock, a peak power of each electrical shock, a duration of each electrical shock, a shape of each electrical shock, or whether each electrical shock is monophasic or biphasic.

The post-shock column 212 includes two sub-columns: an ECG column 220 and a pause column 222. The ECG column 220 shows segments of the ECG of the patient that were detected within a threshold time period after the electrical shocks were administered to the patient. For example, the segments in the ECG column 220 indicate whether an arrhythmia of the patient was at least temporarily resolved based on each electrical shock, and therefore enables the user viewing the report 200 to efficiently identify whether the patient had a refractory arrhythmia or a recurrent arrhythmia. In some cases, the ECG column 220 illustrates 3-, 5-, or 10-second segments of the ECG of the patient. Each segment illustrated in the ECG column 220 has the same length. Furthermore, the segments of the ECG column 220 are vertically aligned with one another in the report 200. The pause column 222 indicates a length of a chest compression pause that occurred after each electrical shock. For instance, the rescuer resumed chest compressions three seconds after the fifth electrical shock.

The peri-shock column 214 indicates chest compression pauses that occurred during the administration of the respective electrical shocks. In particular, the chest compression indicated in the peri-shock column 214 are time intervals extending from the times at which chest compressions cease prior to the electrical shocks and to the times at which the chest compressions resume after the electrical shocks are administered.

Figure 2B:
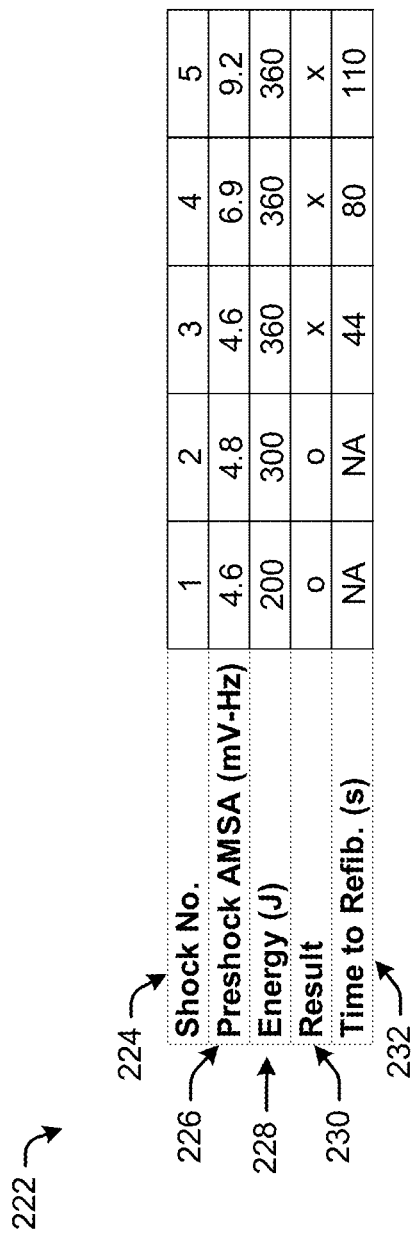
FIG. 2B illustrates an example of another type of report summarizing the results of multiple electrical shocks administered to a patient during a rescue event.

FIG. 2B illustrates an example of another type of report 222 summarizing the results of multiple electrical shocks administered to a patient with VF during a rescue event. The report 222 includes five rows corresponding to five different descriptors related to five different shock events. The descriptors include a shock number 224, a preshock amplitude spectral area (AMSA) 226, an energy 228, a result 230, and a time to refibrillation 232.

The shock number 224 counts the shocks administered to a patient during a rescue event. In the example illustrated in FIG. 2B, the patient receives five different shocks over the course of the rescue event.

The preshock AMSA 226 indicates a score related to the predicted effectiveness of each shock. The Score, for instance, is a numerical value calculated by adding the magnitude of the weighted frequency spectrum of the ECG of the patient between a first threshold (e.g., 2, 3, 4, or 5 Hz) and a second threshold (e.g., 40, 45, or 48 Hz). In some cases, a bandpass filter with the first threshold and the second threshold as cutoff frequencies is applied to data representing the ECG, and the AMSA is calculated from the filtered data. For instance, the score is measured in units of mV-Hz. In various cases, the score is correlated with the probability that ventricular fibrillation will be reversed by a defibrillation treatment.

The energy 228 indicates the energy of each shock administered to the patient during the rescue event. The energy 228, for instance, is measured in J. The result 230 indicates whether the VF at least temporarily resolved upon each shock. If the VF resumed after the shock, the time to refibrillate 232 indicates the time interval between administration of the shock and subsequent onset of the VF.

In the example illustrated in FIG. 2B, the patient was initially treated with a 200 J shock, wherein the patient had a preshock AMSA of 4.6 mV-Hz. However, the VF did not resolve in the patient's ECG. Because the VF was not even temporarily resolved by the first shock, the second shock administered to the patient had a higher energy level of 300 J, wherein the patient and a preshock AMSA of 4.8 mV-Hz. Again, the VF was not resolved, even temporarily, by the second shock. The energy level was subsequently escalated again, such that the third shock was administered at an energy level of 360 J, while the patient had a preshock AMSA of 4.6 mV-Hz. In this case, the third shock did temporarily resolve the VF, but the patient refibrillated 44 seconds after the third shock. Because the third shock temporarily resolved the VF, the energy level of the fourth shock was also at 360 J, wherein the patient had a preshock AMSA of 6.9 mV-Hz. It took 80 seconds for the patient to subsequently refibrillate. The preshock AMSA of the patient before the fifth shock was 9.2 mV-Hz. The fifth shock, once again, was administered at 360 J, and temporarily resolved the VF for 110 seconds. By summarizing key features of multiple treatments administered to the patient, the report 222 enables a user (e.g., a rescuer) to view important context to the patient's ongoing treatment. For instance, the increasing preshock AMSA values in the report 222 provides the rescuer with evidence that the patient's VF is treatable.

Although not specifically illustrated in FIG. 2B, in some cases, the report 222 includes an additional row that indicates whether each shock was appropriate or inappropriate. For instance, the additional row may indicate whether VF was present in the ECG prior to or at the time that each shock was administered. If VF was not present in the ECG, the row may indicate that a given shock was inappropriate. If VF was present in the ECG, the row may indicate that a given shock was appropriate.

Figure 3:
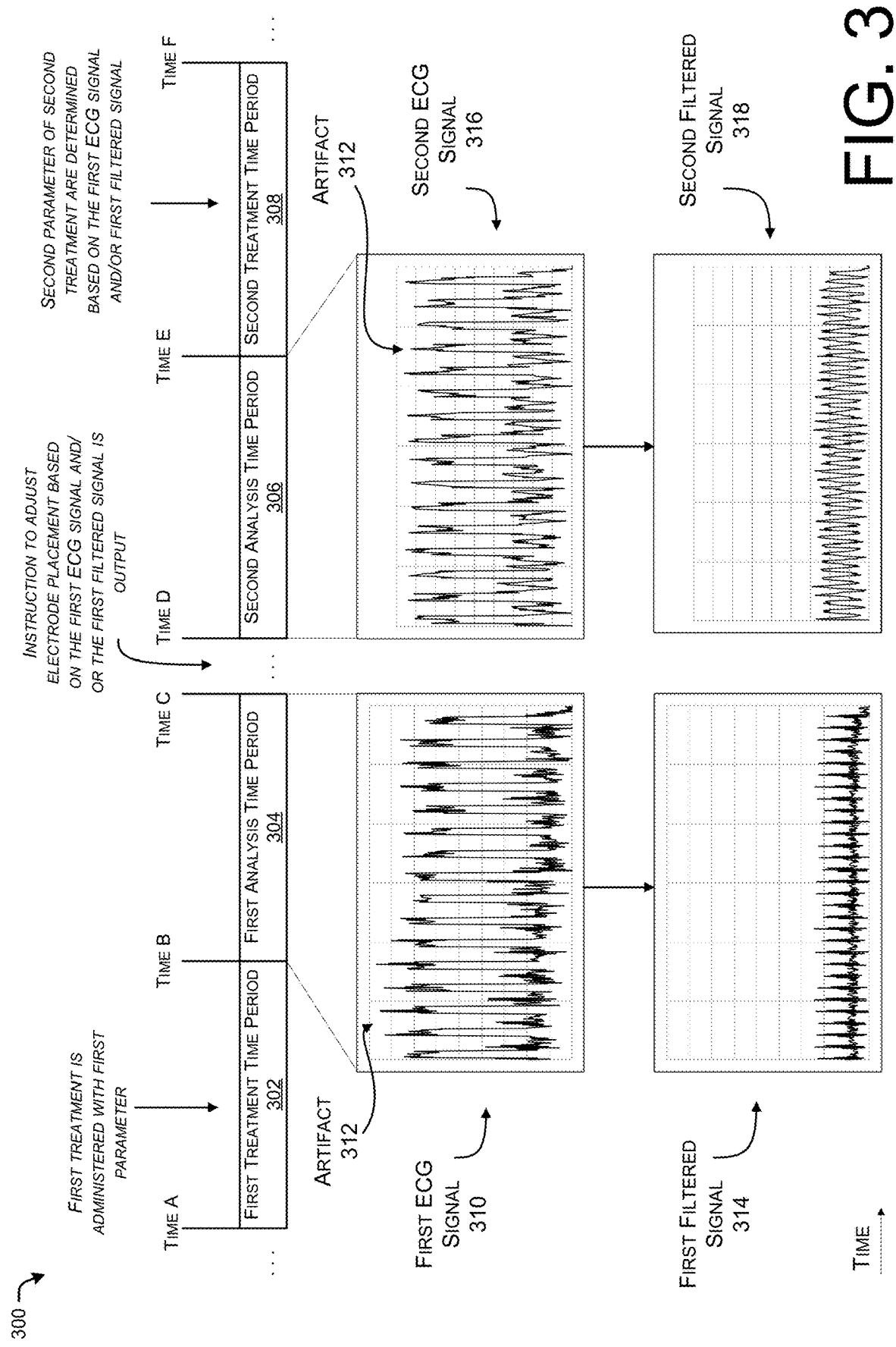
FIG. 3 illustrates an example timeline for maintaining or modifying a treatment parameter based on monitoring a patient after an initial treatment and during a time period.

FIG. 3 illustrates an example timeline 300 for maintaining or modifying a treatment parameter based on monitoring a patient after an initial treatment and during a time period (here, a first analysis time period). The treatments described with reference to FIG. 3 are electrical shocks. As shown, the timeline 300 includes a first treatment time period 302, a first analysis time period 304, a second analysis time period 306, and a second treatment time period 308. The timeline 300 illustrated in FIG. 3 is not necessarily drawn to scale.

The first treatment time period 302 is defined between a Time A and a Time B. During the first treatment time period 302, a first treatment is applied to a patient. For example, a first electrical shock is administered to the patient during the first time period 302. The first electrical shock is defined according to a first parameter. The first parameter includes, for instance, an energy level of the first electrical shock.

The first analysis time period 304 occurs subsequent to the first treatment time period 302. In cases where the first treatment includes administering an electrical shock to the patient, the first analysis time period 304 can refer to a "post-shock time period." The first analysis time period 304 is defined between the Time B and a Time C. In various implementations, the first analysis time period 304 is subsequent to the first treatment time period 302. For example, the first measurement in the first analysis time period 304 is obtained within a particular time period (e.g., a time period within 1 second to 30 seconds, such as within 1 second, 5 seconds, 10 seconds, 30 seconds, or 30 seconds) of the end of the first electrical shock and/or the first treatment time period 302. In some cases, a duration of the first analysis time period 304 can be between 1 second and 1 minute, such as 5 seconds, 10 seconds, 30 seconds, or 1 minute.

In various cases, a user performs CPR on the patient during the first analysis time period 304. For example, the user performs CPR on the patient from Time B to a Time E, after which a second treatment is applied to the patient if a shockable arrhythmia is observed at Time E. A duration extending between Time B to Time E, for example, is two minutes. During the first analysis time period 304, a first ECG signal 310 is obtained. The first ECG signal 310 represents electrical measurements obtained from the patient during the first analysis time period 304. For instance, if the first treatment includes administering an electrical shock to the patient, the first ECG signal 310 is a "post-shock segment" of the ECG. In various cases, an artifact 312 is present in the first ECG signal. The artifact 312 is caused by the CPR. For instance, the artifact 312 represents noise introduced by the user performing chest compressions on the patient. In various implementations, the artifact 312 is defined by a spectrum in the frequency domain. A first filtered signal 312 is obtained by filtering the artifact 312 in the first ECG signal 310. The first filtered signal 312 is obtained, for example, using CPRINSIGHT® or any suitable filtering technique that reduces and/or removes the artifact 312 from the first ECG signal 310.

The first filtered signal 312 is analyzed to determine whether the first treatment was at least temporarily effective. For example, a rhythm depicted in the first filtered signal 312 is identified. If the rhythm depicted in the first filtered signal 312 is the shockable arrhythmia for the duration of the first analysis period, then the first treatment is determined to have been ineffective in treating the shockable arrhythmia. However, if the rhythm depicted in the first filtered signal 312 is only partially a shockable arrhythmia (i.e., a non-shockable rhythm is also identified within the first filtered signal 312), then the first treatment is determined to have been effective in treating the shockable arrhythmia, albeit temporarily.

The second analysis time period 306 is defined between a Time D and Time E. In various examples, the second analysis time period 306 occurs subsequent to the first analysis time period 304. In various cases, the user is administering CPR to the patient during the second analysis time period 306. During the second analysis time period 306, a second ECG signal 316 is obtained. The second ECG signal 316 represents electrical measurements obtained from the patient during the second analysis time period 306. In cases where the second treatment includes administering an electrical shock to the patient, the second analysis time period 306 may be referred to as a "pre-shock interval" and the second ECG signal 316 may be referred to as a "pre-shock segment" of the ECG of the patient. In various cases, the artifact 312 is present in the first ECG signal, due to the administration of CPR to the patient, is also present during the second analysis time period 306. A second filtered signal 318 is obtained by filtering the artifact 312 in the second ECG signal 316. The second filtered signal 318 is obtained, for example, using CPRINSIGHT® or any suitable filtering technique that reduces and/or removes the artifact 312 from the second ECG signal 316.

In various implementations, the shockable arrhythmia is detected in the second filtered signal 318. Thus, a second treatment is prepared. In various implementations, the second ECG signal 316 and/or the second filtered signal 318 are analyzed in order to identify the Time E, at which the second treatment is applied. According to some examples, Time E is identified based on a periodic trend associated with the second filtered signal 318. For instance, Time E is selected to be contemporaneous with a positive slope portion of the second filtered signal 318. In various cases, Time E is identified so that the second treatment is synchronized with the shockable arrhythmia exhibited in the second filtered signal 318.

The second treatment is administered to the patient during the second treatment time period 308. The second treatment time period 308 is defined between Time E and a Time F. In various implementations, the second treatment includes a second electrical shock administered to the patient. The second electrical shock is defined according to a second parameter. The second parameter includes, for instance, an energy level of the second electrical shock.

According to some implementations, the second treatment is prepared based on the first ECG signal 310 and/or the first filtered signal 314. For example, the (second) parameter of the second electrical shock is the same as the (first) parameter of the first electrical shock, if the first filtered signal 314 indicates that the first electrical shock was at least temporarily effective. However, the second parameter of the second electrical shock is different than the first parameter of the first electrical shock, if the first filtered signal 314 indicates that the first electrical shock was ineffective at treating the shockable arrhythmia. Thus, in various cases, the second parameter of the second treatment is based on the first ECG signal 310 and/or the first filtered signal 314.

According to some examples, an instruction is output to the user based on the first ECG signal 310 and/or the first filtered signal 314. For example, if the first filtered signal 314 indicates that the first electrical shock was ineffective, the instruction instructs the user to reposition electrodes through which the first electrical shock was discharged and through which the second electrical shock will be discharged. Thus, the electrodes may be positioned differently when the second electrical shock is administered. In some cases, the instruction is output between the Time C and the Time D.

In various cases, the user administers CPR to the patient continuously from Time B to Time E of the timeline 300. Despite the artifact 312 from the CPR, an ECG of the patient can be analyzed while the CPR is administered. Further, in some cases, an instruction to adjust (e.g., reposition) the electrodes can be output to the user and/or the second treatment is modified based on the first ECG signal 310 and/or the first filtered signal 314, which are obtained after the first treatment.

According to various implementations, the first electrical shock and the second electrical shock are consecutive electrical shocks, such that no other electrical shocks are administered to the patient between Time B and Time E. In various examples, the total duration of the timeline 300 is no longer than 15 minutes, 10 minutes, 5 minutes, or 3 minutes. For example, a duration between Time B and Time E is no longer than 3 minutes.

Figure 4:
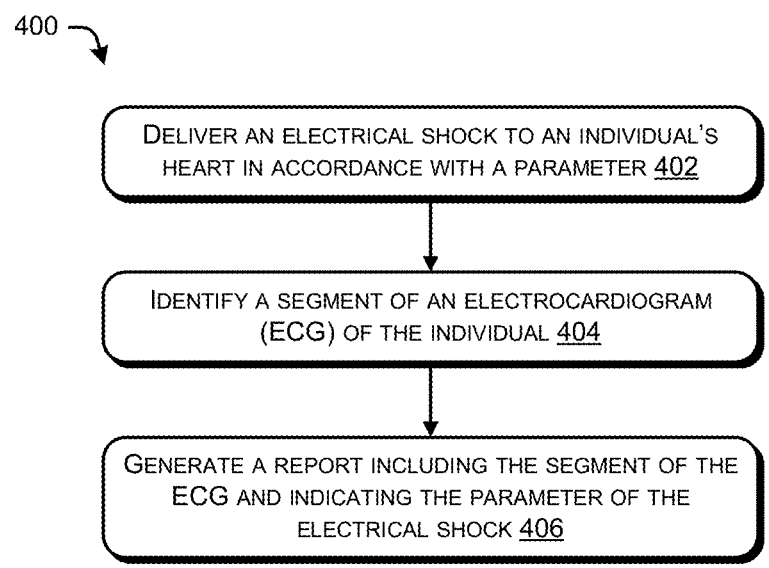
FIG. 4 illustrates an example process for generating a report about defibrillation treatments administered to a patient.

FIG. 4 illustrates an example process 400 for generating a report about defibrillation treatments administered to a patient. The process 400 is performed, for example, by an entity including a computer system, a monitor-defibrillator, a medical device, a computing device connected between the monitor-defibrillator and ECG electrodes, or a combination thereof.

At 402, the entity delivers an electrical shock to an individual's heart in accordance with a parameter. In various cases, the entity delivers the electrical shock via a pair of electrodes disposed on the chest of the individual. In some cases, the electrical shock is administered automatically or in response to an input signal received from a user (e.g., a rescuer). The parameter, for instance, is an energy level of the electrical shock, a duration of the electrical shock, a shape of an electrical pulse of the electrical shock, or a peak voltage of the electrical shock. The electrical shock is configured to treat a shockable arrhythmia (e.g., VF or VT) of the individual's heart.

At 404, the entity identifies a segment of an ECG of the individual. In various cases, the segment is detected within a threshold time period (e.g., a time period between 1 second and 1 minute, such as 10 seconds or 30 seconds of the end of the administration of the electrical shock). For instance, the segment is detected immediately after the electrical shock is administered to the individual. In various cases, the shockable arrhythmia to which the shock was delivered is a recurrent arrhythmia and is at least partially resolved in the segment but later recurs. In some examples, the shockable arrhythmia is a refractory arrhythmia and is present throughout the segment.

In some cases, chest compressions are administered to the individual as the segment is being detected. The entity, in various implementations, removes or otherwise accommodates for an artifact in the segment of the ECG that corresponds to the chest compressions. Accordingly, the segment is accurately obtained without a pause in chest compressions administered to the individual.

At 406, the entity generates a report including the segment of the ECG and indicating the parameter of the electrical shock. For example, the report includes a row that includes the segment and the parameter of the electrical shock. In various implementations, the report includes additional elements in the row, such as a shock number of the electrical shock, a time of the electrical shock, an analysis mode of the entity at before the electrical shock was administered, a pre-shock pause, a pre-shock ECG segment, a post-shock pause, or a peri-shock pause. In various implementations, the report further includes one or more rows corresponding respectively to one or more other electrical shocks administered to the individual. For instance, the post-shock ECG segments associated with the electrical shocks, as well as the parameters associated with the electrical shocks, are vertically aligned.

In some cases, the entity further outputs the report. For example, the entity includes a screen that visually outputs the report. In some cases, one or more elements of the report are output using an alternate output device, such as a speaker that audibly outputs the report. In some instances, the entity transmits data indicative of the report to an external device. A user may view or otherwise review the report using the external device.

According to some implementations, the entity identifies the recurrent arrhythmia in the segment of the ECG. In some cases, the entity automatically maintains the parameter for a subsequent electrical shock administered to the individual. In various instances, the entity outputs a recommendation to maintain the parameter for the subsequent electrical shock and/or to maintain a position of the electrodes on the individual's chest.

According to some cases, the entity identifies the refractory arrhythmia in the segment of the ECG. In some examples, the entity automatically modifies (e.g., escalates) the parameter for the subsequent electrical shock administered to the individual. In various implementations, the entity outputs a recommendation to modify (e.g., escalate) the parameter for the subsequent electrical shock and/or to change a position of the electrodes on the individual's chest.

Figure 5:
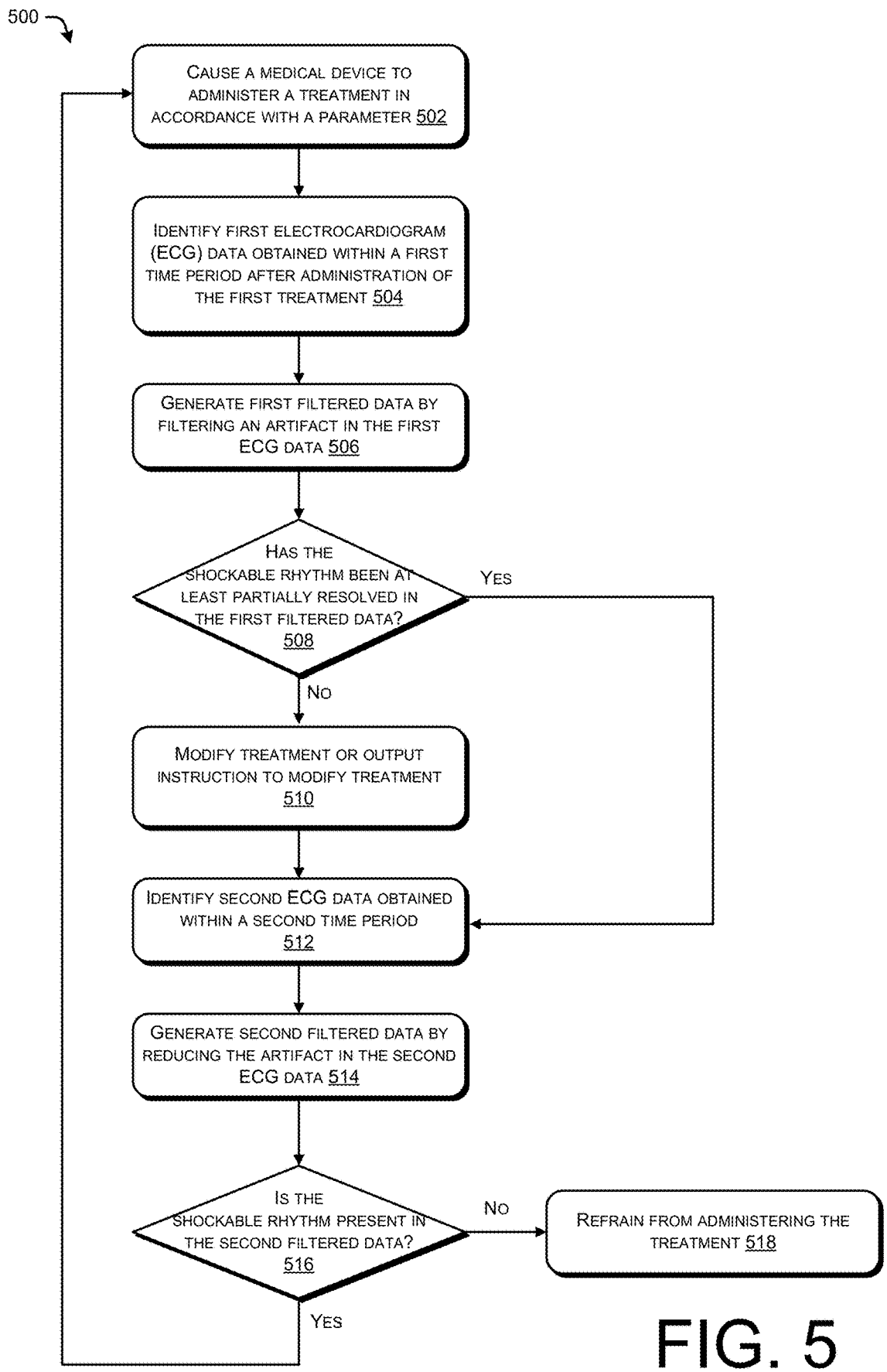
FIG. 5 illustrates an example process for selectively modifying a subsequent treatment of a shockable arrhythmia based on a patient's reaction to an initial treatment.

FIG. 5 illustrates an example process 500 for selectively modifying a subsequent treatment of a shockable arrhythmia based on a patient's reaction to an initial treatment. The process 500 is performed, for example, by an entity including a computer system, a monitor-defibrillator, a medical device, a computing device connected between the monitor-defibrillator and ECG electrodes, or a combination thereof.

At 502, the entity causes a medical device to administer a treatment in accordance with a parameter. In various examples, the medical device includes a defibrillator and the treatment is a electrical shock. The treatment is administered to a patient exhibiting a shockable arrhythmia, in various examples. The parameter characterizes the treatment. For instance, the parameter is an energy level of the electrical shock, a duration of the electrical shock, a shape of an electrical pulse of the electrical shock, a peak voltage of the electrical shock, or the like. According to various examples, the treatment is administered via electrodes that are disposed on the patient. The treatment is administered, for instance, across the heart of the patient.

At 504, the entity identifies first ECG data obtained within a threshold time period (here, a first time period) after administration of the treatment. In some cases, the ECG data is measured using the same electrodes used to administer the treatment. For instance, the first ECG data is generated based on an electrical signal across the electrodes. The electrical signal is generated, for example, by the heart of the patient. In various cases, the analog electrical signal is converted into a digital signal by an analog-to-digital converter. The ECG data is a digital signal including discrete data points, in various cases. According to various implementations, the first time period occurs within a threshold time period (e.g., a time period between 1 second and 1 minute, such as 10 seconds or 30 seconds of the end of the administration of the treatment.

At 506, the entity generates first filtered data by filtering (e.g., reducing and/or removing) an artifact in the first ECG data. In various cases, the artifact is generated based on CPR administered to the patient during the first time period. For instance, the artifact corresponds to chest compressions administered to the patient during the first time period. The first filtered data is generated, in various examples, using digital signal processing. In some cases, the first filtered data is generated by applying a filter (e.g., a comb filter, an adaptive filter, an infinite impulse response (IIR) filter, or a combination thereof) to the first ECG data. In particular instances, the artifact is filtered (e.g., detected and compensated for) using CPRINSIGHT®.

At 508, the entity determines whether the shockable arrhythmia has been at least temporarily resolved in the first filtered data. In various examples, the entity determines whether the shockable arrhythmia is present in the first filtered data. For example, the entity identifies whether the first filtered data exhibits a characteristic frequency of the shockable arrhythmia. In various cases, the shockable arrhythmia is determined to have been at least temporarily resolved if the shockable arrhythmia is missing entirely or present only in a terminal portion (e.g., the latter half, or some other portion) of the first filtered data. For instance, the entity determines that a non-shockable arrhythmia is present in the first filtered data. On the other hand, in some cases, the shockable arrhythmia is determined to have been unresolved if the shockable arrhythmia remains present throughout the first filtered data.

If the entity determines at 508 that the shockable arrhythmia was not resolved at any point of the first filtered data, then the process 500 proceeds to 510. At 510, the entity modifies the treatment or outputs an instruction to modify the treatment. For example, the entity modifies the parameter, outputs an instruction to modify the treatment, reports the treatment, or any combination thereof. For instance, the entity, outputs an instruction to adjust an electrode placement, outputs an instruction to adjust the treatment administered to the patient in some other way, outputs an alert indicating to the user that the arrhythmia is a refractory arrhythmia, logs an event in the data record indicating that the shockable arrhythmia was not resolved at any point of the first filtered data, or transmits an indication of the event to a remote device or display in real time or near-real time. For example, the entity changes the energy level of future treatments administered to the patient. In some cases, the entity increases the parameter. In various examples, the entity outputs the instruction to adjust the placement of one or more electrodes via a user interface. In various instances, the electrodes are used to obtain the ECG data and/or deliver the treatment to the patient. For example, the instruction may be an audio/visual instruction indicating that a user should change the position of one or more of the electrodes with respect to each other, with respect to features of the patient's physiology, reattach the electrodes, or the like. In some cases, the user may change the placement of the electrodes in response to receiving the instruction.

If, on the other hand, the entity determines that the shockable arrhythmia was at least temporarily resolved in the first filtered data at 508, or once the entity performs 510, then the process 500 proceeds to 512. At 512, the entity identifies second ECG data obtained within a second time period. In some cases, the second ECG data is measured using the same electrodes used to administer the treatment and/or to obtain the first ECG data. In various instances, the second ECG data is generated based on an electrical signal across the electrodes during the second time period. The electrical signal is generated, for example, by the heart of the patient. In various cases, the analog electrical signal is converted into a digital signal by an analog-to-digital converter. The second ECG data is a digital signal including discrete data points, in various cases. According to various implementations, the second time period occurs after the first time period. In some cases, the second time period occurs within a second threshold time period (e.g., 10 seconds, 30 seconds, or some other time period) prior to the administration of a second treatment. For instance, the second time period occurs prior to the administration of a subsequent treatment.

At 514, the entity generates second filtered data by reducing the artifact in the second ECG data. In various cases, the artifact is generated based on CPR administered to the patient during the second time period. For instance, the artifact corresponds to chest compressions administered to the patient during the second time period. In some cases, CPR is administered to the patient continuously after the treatment, through the first time period, and through the second time period. The second filtered data is generated, in various examples, using digital signal processing. In some cases, the second filtered data is generated by applying the filter to the second ECG data. In particular instances, the artifact is filtered (e.g., detected and compensated for) using CPRINSIGHT®.

At 516, the entity determines whether the shockable arrhythmia is present in the second filtered data. In some cases, the entity determines that a non-shockable rhythm is present in the second filtered data and therefore determines that the treatment is no longer indicated for the patient. If the entity determines that the shockable arrhythmia is absent from the second filtered data at 516, then the process 500 proceeds to 518. At 518, the entity refrains from administering the treatment.

If, on the other hand, the entity determines that the shockable arrhythmia is present in the second filtered data, then the process 500 returns to 502. If the parameter was modified at 510, then the subsequent treatment is administered with the modified parameter. For example, if the energy level was increased at 510, then the subsequent electrical shock is administered at the increased energy level. However, if 510 was skipped, then the subsequent electrical shock is administered at the same energy level as the previous electrical shock.

In various implementations, when the entity determines that the shockable arrhythmia is present in the second filtered data, after having been at least temporarily resolved in the first filtered data at 508, the entity outputs an alert to the user that the shockable arrhythmia is a recurrent shockable arrhythmia, and/or logs an event in the data record indicating that the shockable arrhythmia at that time point is a recurrent shockable arrhythmia, and/or transmits this event to a remote device or display in real time or near-real time. For example, the entity stores or transmits data indicating that the shockable arrhythmia has been detected.

In various implementations, the entity generates a report summarizing multiple electrical shocks administered to the individual. For example, the report includes ECG segments detected within a threshold time period after each of the multiple electrical shocks. Accordingly, a user viewing the report is able to efficiently identify whether the individual has a recurrent or refractory arrhythmia. The ECG segments are aligned, in some cases. In some implementations, the report further includes one or more parameters of the respective electrical shocks.

Figure 6:
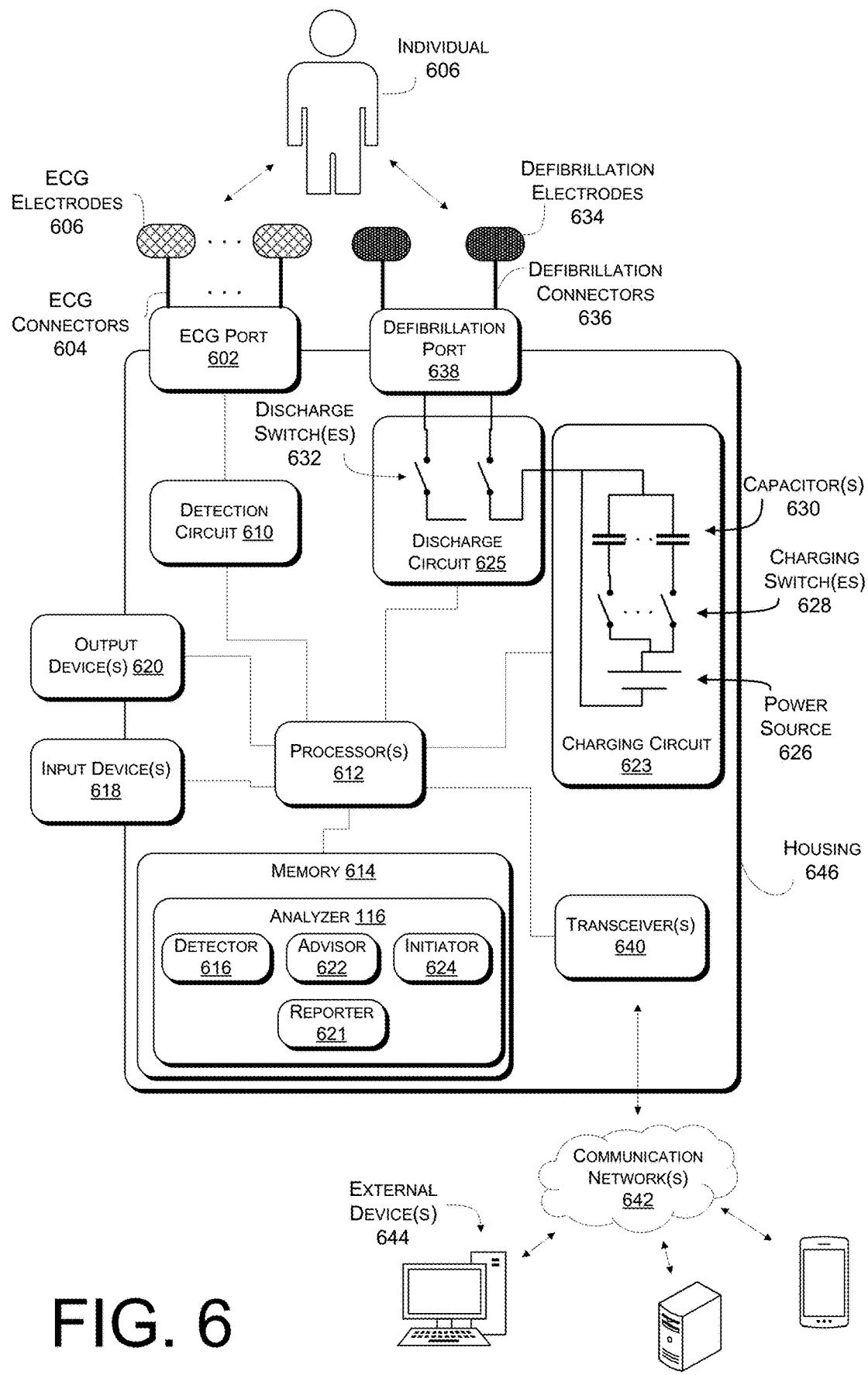
FIG. 6 illustrates an example of an external defibrillator configured to perform various functions described herein.

FIG. 6 illustrates an example of an external defibrillator 600 configured to perform various functions described herein. For example, the external defibrillator 600 is the monitor-defibrillator 106 described above with reference to FIG. 1.

The external defibrillator 600 includes an electrocardiogram (ECG) port 602 connected to multiple ECG leads 604. In some cases, the ECG leads 604 are removeable from the ECG port 602. For instance, the ECG leads 604 are plugged into the ECG port 602. The ECG leads 604 are connected to ECG electrodes 606, respectively. In various implementations, the ECG electrodes 606 are disposed on different locations on an individual 608. A detection circuit 610 is configured to detect relative voltages between the ECG electrodes 606. These voltages are indicative of the electrical activity of the heart of the individual 608.

In various implementations, the ECG electrodes 606 are in contact with the different locations on the skin of the individual 608. In some examples, a first one of the ECG electrodes 606 is placed on the skin between the heart and right arm of the individual 608, a second one of the ECG electrodes 606 is placed on the skin between the heart and left arm of the individual 608, and a third one of the ECG electrodes 606 is placed on the skin between the heart and a leg (either the left leg or the right leg) of the individual 608. In these examples, the detection circuit 608 is configured to measure the relative voltages between the first, second, and third ECG electrodes 606. Respective pairings of the ECG electrodes 606 are referred to as "leads," and the voltages between the pairs of ECG electrodes 606 are known as "lead voltages." In some examples, more than three ECG electrodes 606 are included, such that 5-lead or 12-lead ECG signals are detected by the detection circuit 610.

The detection circuit 610 includes at least one analog circuit, at least one digital circuit, or a combination thereof. The detection circuit 610 receives the analog electrical signals from the ECG electrodes 606, via the ECG port 602 and the ECG leads 604. In some cases, the detection circuit 610 includes one or more analog filters configured to filter noise and/or artifact from the electrical signals. The detection circuit 610 includes an analog-to-digital (ADC) in various examples. The detection circuit 610 generates a digital signal indicative of the analog electrical signals from the ECG electrodes 606. This digital signal can be referred to as an "ECG signal" or an "ECG."

In some cases, the detection circuit 610 further detects an electrical impedance between at least one pair of the ECG electrodes 606. For example, the detection circuit 610 includes, or otherwise controls, a power source that applies a known voltage across a pair of the ECG electrodes 606 and detects a resultant current between the pair of the ECG electrodes 606. The impedance is generated based on the applied voltage and the resultant current or the applied current and the resultant voltage. In various cases, the impedance corresponds to respiration of the individual 608, chest compressions performed on the individual 608, and other physiological states of the individual 608. In various examples, the detection circuit 610 includes one or more analog filters configured to filter noise and/or artifact from the resultant current. The detection circuit 610 generates a digital signal indicative of the impedance using an ADC. This digital signal can be referred to as an "impedance signal" or an "impedance."

The detection circuit 610 provides the ECG signal and/or the impedance signal one or more processors 612 in the external defibrillator 600. In some implementations, the processor(s) 612 includes a central processing unit (CPU), a graphics processing unit (GPU), both CPU and GPU, or other processing unit or component known in the art.

The processor(s) 612 is operably connected to memory 614. In various implementations, the memory 612 is volatile (such as random access memory (RAM)), non-volatile (such as read only memory (ROM), flash memory, etc.) or some combination of the two. The memory 614 stores instructions that, when executed by the processor(s) 612, causes the processor(s) 612 to perform various operations. In various examples, the memory 614 stores methods, threads, processes, applications, objects, modules, any other sort of executable instruction, or a combination thereof. In some cases, the memory 614 stores files, databases, or a combination thereof. In some examples, the memory 614 includes, but is not limited to, RAM, ROM, electrically erasable programmable read-only memory (EEPROM), flash memory, or any other memory technology. In some examples, the memory 614 includes one or more of CD-ROMs, digital versatile discs (DVDs), content-addressable memory (CAM), or other optical storage, magnetic cassettes, magnetic tape, magnetic disk storage or other magnetic storage devices, or any other medium which can be used to store the desired information and which can be accessed by the processor(s) 612 and/or the external defibrillator 600. In some cases, the memory 614 at least temporarily stores the ECG signal and/or the impedance signal. Although not illustrated in FIG. 6, in some implementations, at least one of the processors 612 and at least a portion of the memory 614 is included in a computing device connected between the ECG connectors 604 and the ECG electrodes 606.

In various examples, the memory 614 includes a detector 616, which causes the processor(s) 612 to determine, based on the ECG signal and/or the impedance signal, whether the individual 608 is exhibiting a particular heart rhythm. For instance, the processor(s) 612 determines whether the individual 608 is experiencing a shockable arrhythmia that is treatable by defibrillation. Examples of shockable arrhythmias include VF and VT. In some examples, the processor(s) 612 determines whether any of a variety of different rhythms (e.g., asystole, sinus rhythm, atrial fibrillation (AF), etc.) are present in the ECG signal.

The processor(s) 612 is operably connected to one or more input devices 618 and one or more output devices 620. Collectively, the input device(s) 618 and the output device(s) 620 function as an interface between a user and the defibrillator 600. The input device(s) 618 is configured to receive an input from a user and includes at least one of a keypad, a cursor control, a touch-sensitive display, a voice input device (e.g., a speaker), a haptic feedback device, or any combination thereof. The output device(s) 620 includes at least one of a display, a speaker, a haptic output device, a printer, or any combination thereof. In various examples, the processor(s) 612 causes a display among the input device(s) 618 to visually output a waveform of the ECG signal and/or the impedance signal. In some implementations, the input device(s) 618 includes one or more touch sensors, the output device(s) 620 includes a display screen, and the touch sensor(s) are integrated with the display screen. Thus, in some cases, the external defibrillator 600 includes a touchscreen configured to receive user input signal(s) and visually output physiological parameters, such as the ECG signal and/or the impedance signal.

In some examples, the memory 614 includes an advisor 622, which, when executed by the processor(s) 612, causes the processor(s) 612 to generate advice and/or control the output device(s) 620 to output the advice to a user (e.g., a rescuer). In some examples, the processor(s) 612 provides, or causes the output device(s) 620 to provide, an instruction to perform CPR on the individual 608. In some cases, the processor(s) 612 evaluates, based on the ECG signal, the impedance signal, or other physiological parameters, CPR being performed on the individual 608 and causes the output device(s) 620 to provide feedback about the CPR in the instruction. According to some examples, the processor(s) 612, upon identifying that a shockable arrhythmia is present in the ECG signal, causes the output device(s) 620 to output an instruction and/or recommendation to administer a electrical shock to the individual 608. In some cases, the instruction and/or recommendation is to change a parameter of the defibrillation treatment administered to the individual 608 and/or a placement of the defibrillation electrodes 634 on the chest of the individual 608.

The memory 614 also includes an initiator 624 which, when executed by the processor(s) 612, causes the processor(s) 612 to control other elements of the external defibrillator 600 in order to administer a electrical shock to the individual 608. In some examples, the processor(s) 612 executing the initiator 624 selectively causes the administration of the electrical shock based on determining that the individual 608 is exhibiting the shockable arrhythmia and/or based on an input from a user (received, e.g., by the input device(s) 618. In some cases, the processor(s) 612 causes the electrical shock to be output at a particular time, which is determined by the processor(s) 612 based on the ECG signal and/or the impedance signal.

In various implementations, the memory 614 includes a reporter 621 which, when executed by the processor(s) 612, causes the processor(s) 612 to generate a report that includes one or more segments of the ECG signal of the individual 608. In some cases, the report further indicates one or more parameters of electrical shocks that were previously applied to the individual 608.

The processor(s) 612 is operably connected to a charging circuit 623 and a discharge circuit 625. In various implementations, the charging circuit 623 includes a power source 626, one or more charging switches 628, and one or more capacitors 630. The power source 626 includes, for instance, a battery. The processor(s) 612 initiates a electrical shock by causing the power source 626 to charge at least one capacitor among the capacitor(s) 630. For example, the processor(s) 612 activates at least one of the charging switch(es) 628 in the charging circuit 623 to complete a first circuit connecting the power source 626 and the capacitor to be charged. Then, the processor(s) 612 causes the discharge circuit 625 to discharge energy stored in the charged capacitor across a pair of defibrillation electrodes 630, which are in contact with the individual 608. For example, the processor(s) 612 deactivates the charging switch(es) 628 completing the first circuit between the capacitor(s) 630 and the power source 626, and activates one or more discharge switches 632 completing a second circuit connecting the charged capacitor 630 and at least a portion of the individual 608 disposed between defibrillation electrodes 634.

The energy is discharged from the defibrillation electrodes 634 in the form of a electrical shock. For example, the defibrillation electrodes 634 are connected to the skin of the individual 608 and located at positions on different sides of the heart of the individual 608, such that the electrical shock is applied across the heart of the individual 608. The electrical shock, in various examples, depolarizes a significant number of heart cells in a short amount of time. The electrical shock, for example, interrupts the propagation of the shockable arrhythmia (e.g., VF or VT) through the heart. In some examples, the electrical shock is 200 J or greater with a duration of about 0.015 seconds. In some cases, the electrical shock has a multiphasic (e.g., biphasic) waveform. The discharge switch(es) 632 are controlled by the processor(s) 612, for example. In various implementations, the defibrillation electrodes 634 are connected to defibrillation leads 636. The defibrillation leads 636 are connected to a defibrillation port 638, in implementations. According to various examples, the defibrillation leads 636 are removable from the defibrillation port 638. For example, the defibrillation leads 636 are plugged into the defibrillation port 638.

In various implementations, the processor(s) 612 is operably connected to one or more transceivers 640 that transmit and/or receive data over one or more communication networks 642. For example, the transceiver(s) 640 includes a network interface card (NIC), a network adapter, a local area network (LAN) adapter, or a physical, virtual, or logical address to connect to the various external devices and/or systems. In various examples, the transceiver(s) 640 includes any sort of wireless transceivers capable of engaging in wireless communication (e.g., radio frequency (RF) communication). For example, the communication network(s) 642 includes one or more wireless networks that include a $3^{rd}$ Generation Partnership Project (3GPP) network, such as a Long Term Evolution (LTE) radio access network (RAN) (e.g., over one or more LE bands), a New Radio (NR) RAN (e.g., over one or more NR bands), or a combination thereof. In some cases, the transceiver(s) 640 includes other wireless modems, such as a modem for engaging in WI-FI®, WIGIG®, WIMAX®, BLUETOOTH®, or infrared communication over the communication network(s) 642.

The defibrillator 600 is configured to transmit and/or receive data (e.g., ECG data, impedance data, data indicative of one or more detected heart rhythms of the individual 608, data indicative of one or more electrical shocks administered to the individual 608, data indicative of a report, etc.) with one or more external devices 644 via the communication network(s) 642. The external devices 644 include, for instance, mobile devices (e.g., mobile phones, smart watches, etc.), Internet of Things (IoT) devices, medical devices, computers (e.g., laptop devices, servers, etc.), or any other type of computing device configured to communicate over the communication network(s) 642. In some examples, the external device(s) 644 is located remotely from the defibrillator 600, such as at a remote clinical environment (e.g., a hospital). According to various implementations, the processor(s) 612 causes the transceiver(s) 640 to transmit data to the external device(s) 644. In some cases, the transceiver(s) 640 receives data from the external device(s) 644 and the transceiver(s) 640 provide the received data to the processor(s) 612 for further analysis.

In various implementations, the external defibrillator 600 also includes a housing 646 that at least partially encloses other elements of the external defibrillator 600. For example, the housing 646 encloses the detection circuit 610, the processor(s) 612, the memory 614, the charging circuit 623, the transceiver(s) 640, or any combination thereof. In some cases, the input device(s) 618 and output device(s) 620 extend from an interior space at least partially surrounded by the housing 646 through a wall of the housing 646. In various examples, the housing 646 acts as a barrier to moisture, electrical interference, and/or dust, thereby protecting various components in the external defibrillator 600 from damage.

In some implementations, the external defibrillator 600 is an automated external defibrillator (AED) operated by an untrained user (e.g., a bystander, layperson, etc.) and can be operated in an automatic mode. In automatic mode, the processor(s) 612 automatically identifies a rhythm in the ECG signal, makes a decision whether to administer a electrical shock, charges the capacitor(s) 630, discharges the capacitor(s) 630, or any combination thereof. In some cases, the processor(s) 612 controls the output device(s) 620 to output (e.g., display) a simplified user interface to the untrained user. For example, the processor(s) 612 refrains from causing the output device(s) 620 to display a waveform of the ECG signal and/or the impedance signal to the untrained user, in order to simplify operation of the external defibrillator 600.

In some examples, the external defibrillator 600 is a monitor-defibrillator utilized by a trained user (e.g., a clinician, an emergency responder, etc.) and can be operated in a manual mode or the automatic mode. When the external defibrillator 600 operates in manual mode, the processor(s) 612 cause the output device(s) 620 to display a variety of information that may be relevant to the trained user, such as waveforms indicating the ECG data and/or impedance data, notifications about detected heart rhythms, and the like.

Example Clauses

1. A monitor-defibrillator, including: a detection circuit configured to detect an electrocardiogram (ECG) of an individual; a screen; a discharge circuit configured to output electrical shocks to the individual's heart; a processor; and memory storing instructions that, when executed by the processor, cause the processor to perform operations including: identifying segments of the ECG detected during time intervals, beginnings of the time intervals being associated with when the electrical shocks are output to the individual's heart, the time intervals having the same length; identifying parameters of the electrical shocks output to the individual's heart; generating a report that indicates the segments of the ECG and the parameters, the segments being vertically aligned in the report; and causing the screen to output the report.
2. The monitor-defibrillator of clause 1, wherein the operations further include: identifying ventricular fibrillation (VF) or ventricular tachycardia (VT) in the ECG; and based on identifying the VF or VT, causing the discharge circuit to output one of the electrical shocks to the individual's heart.
3. The monitor-defibrillator of clause 1 or 2, further including: an input device configured to receive an input signal from a user, wherein the discharge circuit is configured to output one of the electrical shocks to the individual's heart based on the input signal.
4. The monitor-defibrillator of any one of clauses 1 to 3, wherein the operations further include: identifying a length of a pause in chest compressions administered to the patient before or after one of the electrical shocks is output to the patient, and wherein the report further indicates the length of the pause in the chest compressions.
5. A medical device, including: a processor; and memory storing instructions that, when executed by the processor, cause the processor to perform operations including: identifying a segment of an electrocardiogram (ECG) of an individual, the segment being detected during a time interval, a beginning of the time interval being associated with when an electrical shock is output to the individual's heart; identifying a parameter of the electrical shock; and generating a report including the segment of the ECG and indicating the parameter of the electrical shock.
6. The medical device of clause 5, further including: a screen configured to display the report.
7. The medical device of clause 5 or 6, further including: a transceiver configured to transmit a signal indicative of the report to an external device.
8. The medical device of any one of clauses 5 to 7, further including: a detection circuit configured to detect the ECG of the individual.
9. The medical device of any one of clauses 5 to 8, further including: a discharge circuit configured to output the electrical shock to the individual's heart.
10. The medical device of clause 9, the segment being a latter segment, the time interval being a latter time interval, wherein the operations further include: identifying an earlier segment detected during an earlier time interval that ends prior to the electrical shock being output to the individual's heart; determining that the earlier segment is indicative of ventricular fibrillation (VF) or ventricular tachycardia (VT); and based on determining that the earlier segment is indicative of VF or VT, causing the discharge circuit to output the electrical shock to the individual's heart.
11. The medical device of any one of clauses 5 to 10, wherein the parameter includes a voltage amplitude of the electrical shock, a vector of the electrical shock, an energy level of the electrical shock, a duration of the electrical shock, a shape of the electrical shock, or whether the electrical shock is monophasic or biphasic.
12. The medical device of any one of clauses 5 to 11, wherein the operations further include: removing, from the ECG, an artifact associated with chest compressions administered to the individual.
13. The medical device of any one of clauses 5 to 12, wherein the electrical shock is administered to the individual via electrodes disposed on the chest of the individual, and wherein the operations further include: determining that the segment of the ECG indicates a refractory arrhythmia; and based on determining that the segment of the ECG indicates the refractory arrhythmia, outputting a recommendation to change the parameter of the electrical shock or to change a position of the electrodes on the chest of the individual.
14. A method, including: identifying a segment of an electrocardiogram (ECG) of an individual, the segment being detected during a time interval that begins when an electrical shock is output to the individual's heart; identifying a parameter of the electrical shock; generating a report including the segment of the ECG and indicating the parameter of the electrical shock; and outputting the report; or transmitting a signal indicative of the report to an external device.
15. The method of clause 14, the segment being a latter segment, the time interval being a latter time interval, wherein the method further includes: identifying an earlier segment detected during an earlier time interval that ends prior to the electrical shock being output to the individual's heart; determining that the earlier segment is indicative of ventricular fibrillation (VF) or ventricular tachycardia (VT); and based on determining that the earlier segment is indicative of VF or VT, causing a discharge circuit to output the electrical shock to the individual's heart.
16. The method of clause 14 or 15, wherein the parameter includes a voltage amplitude of the electrical shock, a vector of the electrical shock, an energy level of the electrical shock, a duration of the electrical shock, a shape of the electrical shock, or whether the electrical shock is monophasic or biphasic.
17. The method of any one of clauses 14 to 16, further including: removing, from the ECG, an artifact associated with chest compressions administered to the individual.
18. The method of clause 17, wherein removing the artifact associated with the chest compressions administered to the individual includes removing the artifact from the segment of the ECG.
19. The method of any one of clauses 14 to 18, wherein the electrical shock is administered to the individual via electrodes disposed on the chest of the individual, and wherein the method further includes: determining that the segment of the ECG indicates a refractory arrhythmia; and based on determining that the segment of the ECG indicates the refractory arrhythmia, outputting a recommendation to change the parameter of the electrical shock or to change a position of the electrodes on the chest of the individual.
20. The method of any one of clauses 14 to 19, wherein the electrical shock is administered to the individual via electrodes disposed on the chest of the individual, and wherein the method further includes: determining that the segment of the ECG indicates a recurrent arrhythmia, and based on determining that the segment of the ECG indicates the recurrent arrhythmia, outputting a recommendation to maintain the parameter of the electrical shock or to maintain the position of the electrodes on the chest of the individual.
21. A medical device, including: a processor; and memory storing instructions that, when executed by the processor, cause the processor to perform operations including: identifying, based on a physiological parameter of an individual over time, a first instance of an event-ofinterest; identifying a first segment of the physiological parameter over time, the first segment being indicative of the first instance of the event-of-interest; identifying, based on the physiological parameter of the individual over time, a second instance of the event-of-interest; identifying a second segment of the physiological parameter over time, the second segment being indicative of the second instance of the event-of-interest; and generating a report including the first segment vertically time-aligned with the second segment.

22. The medical device of clause 21, wherein the physiological parameter includes an electrocardiogram (ECG) of the individual, a capnograph of the individual, an end-tidal $CO_2$ ($EtCO_2$) of the individual, a partial pressure of $O_2$ in an airway of the individual, a flow rate of air through the airway of the individual, a tidal volume of the individual, a blood oxygenation of the individual, a blood pressure of the individual, an electroencephalogram (EEG) of the individual, a heart rate of the individual, a pulse rate of the individual, a transthoracic impedance of the individual, or a temperature of the individual.

23. The medical device of clause 21 or 22, wherein the event-of-interest includes a heart arrhythmia of the individual, slowing or cessation of breathing by the individual, slowing or cessation of a heart rate of the individual, an administration of a medication to the individual, a return of spontaneous circulation (ROSC) of the individual, a beginning of chest compressions administered to the individual, an ending of chest compressions administered to the individual, or a seizure of the individual.

24. The medical device of any one of clauses 21 to 23, wherein identifying, based on the physiological parameter of an individual over time, the first instance of an event-of-interest includes: identifying a pattern in the physiological parameter;
determining that the physiological parameter is greater than an upper threshold; or
determining that the physiological parameter is less than a lower threshold.

25. The medical device of any one of clauses 21 to 24, wherein identifying, based on the physiological parameter of the individual over time, the second instance of the event-of-interest includes: identifying a pattern in the physiological parameter; determining that the physiological parameter is greater than an upper threshold; or determining that the physiological parameter is less than a lower threshold.

26. The medical device of any one of clauses 21 to 25, further including: a sensor configured to detect the physiological parameter over time.

27. The medical device of any one of clauses 21 to 26, wherein the second instance is a recurrence of the event-of-interest.

28. The medical device of any one of clauses 21 to 27, wherein a beginning of the first segment of the physiological parameter over time is within a threshold time period of the first instance of the event-of-interest.

29. The medical device of any one of clauses 21 to 28, wherein the beginning of the first segment of the physiological parameter over time is simultaneous with the first instance of the event-of-interest.

30. The medical device of any one of clauses 21 to 29, wherein a beginning of the second segment of the physiological parameter over time is within a threshold time period of the second instance of the event-of-interest.

31. The medical device of any one of clauses 21 to 30, wherein the beginning of the second segment of the physiological parameter over time is simultaneous with the second instance of the event-of-interest.

32. The medical device of any one of clauses 21 to 31, wherein a beginning of the first segment is vertically aligned with the beginning of the second segment in the report.

33. The medical device of any one of clauses 21 to 32, further including: a screen configured to visually output the report.

34. A method, including: determining that an arrhythmia is present in a first segment of an electrocardiogram (ECG) of a subject detected during a first time period after administration of a first treatment to the subject; determining that the arrhythmia is present in a second segment of the ECG of the subject detected during a second time period, the second time period being subsequent to the first time period; and causing administration of a second treatment to the subject, a parameter of the second treatment being different than a parameter of the first treatment.

35. The method of clause 34, wherein the arrhythmia includes ventricular fibrillation (VF) or ventricular tachycardia (VT).

36. The method of clause 34 or 35, wherein the first treatment includes a first defibrillation shock and the second treatment includes a second defibrillation shock.

37. The method of clause 36, wherein the parameter of the first treatment includes an energy level or a duration of the first defibrillation shock, wherein the parameter of the second treatment includes an energy level or a duration of the second defibrillation shock, and wherein the parameter of the second treatment is greater than the parameter of the first treatment.

38. The method of clause 36 or 37, wherein the first defibrillation shock and the second defibrillation shock are administered to the subject by defibrillation electrodes, wherein the parameter of the first treatment includes a first location of the defibrillation electrodes on the chest of the subject, and wherein the parameter of the second treatment includes a second location of the defibrillation electrodes on the chest of the subject.

39. The method of clause 38, further including: outputting a recommendation to change the defibrillation electrodes from the first location to the second location.

40. The method of any one of clauses 34 to 39, wherein the first treatment includes and the second treatment include chest compressions, positive pressure ventilation, or administration of a medication.

41. The method of any one of clauses 34 to 40, wherein the first time period begins within 3 seconds after the administration of the first treatment and ends within 1 minute after the administration of the first treatment.

42. The method of any one of clauses 34 to 41, wherein the first time period ends within 12 seconds after the administration of the first treatment.

43. The method of any one of clauses 34 to 42, wherein the first time period begins within 3 seconds after the administration of the first treatment and is between 3 and 30 seconds in duration.

44. The method of any one of clauses 34 to 43, wherein the first time period ends within 1 minute after the administration of the first treatment and is between 3 and 30 seconds in duration.

45. The method of any one of clauses 34 to 44, wherein the second time period is within 1 minute before the administration of the second treatment.

46. The method of any one of clauses 34 to 45, wherein the second time period is within 1 minute before administration of the second treatment and has a duration of 3 to 30 seconds.

47. The method of any one of clauses 34 to 46, further including: reducing or removing an artifact from the ECG, the artifact being caused by chest compressions performed on the subject during the first time period or the second time period.

48. The method of any one of clauses 34 to 47, further including: storing, outputting, or transmitting a report indicating the first segment, the second segment, the parameter of the first treatment, and the parameter of the second treatment.

49. The method of any one of clauses 34 to 48, further including: outputting a report indicating the parameter of the first treatment within 10 to 12 seconds after the administration of the first treatment.

50. A method, including: determining that an arrhythmia is present in a first segment of an electrocardiogram (ECG) of a subject detected during a first time period before administration of a first treatment to the subject; determining that the arrhythmia is absent in a second segment of the ECG of the subject detected during a second time period, the second time period being subsequent to the first time period and the administration of the first treatment; determining that the arrhythmia is present in a third segment of the ECG of the subject detected during a third time period, the third time period being subsequent to the second time period; and causing administration of a second treatment to the subject after the third time period, a parameter of the second treatment being the same as a parameter of the first treatment.

51. A medical device configured to perform any one of the methods of clauses 34 to 50.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be used for realizing implementations of the disclosure in diverse forms thereof.

As will be understood by one of ordinary skill in the art, each implementation disclosed herein can comprise, consist essentially of or consist of its particular stated element, step, or component. Thus, the terms "include" or "including" should be interpreted to recite: "comprise, consist of, or consist essentially of." The transition term "comprise" or "comprises" means has, but is not limited to, and allows for the inclusion of unspecified elements, steps, ingredients, or components, even in major amounts. The transitional phrase "consisting of" excludes any element, step, ingredient or component not specified. The transition phrase "consisting essentially of" limits the scope of the implementation to the specified elements, steps, ingredients or components and to those that do not materially affect the implementation. As used herein, the term "based on" is equivalent to "based at least partly on," unless otherwise specified.

Unless otherwise indicated, all numbers expressing quantities, properties, conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. When further clarity is required, the term "about" has the meaning reasonably ascribed to it by a person skilled in the art when used in conjunction with a stated numerical value or range, i.e. denoting somewhat more or somewhat less than the stated value or range, to within a range of ±20% of the stated value; ±19% of the stated value; ±18% of the stated value; ±17% of the stated value; ±16% of the stated value; ±15% of the stated value; ±14% of the stated value; ±13% of the stated value; ±12% of the stated value; ±11% of the stated value; ±10% of the stated value; ±9% of the stated value; ±8% of the stated value; ±7% of the stated value; ±6% of the stated value; ±5% of the stated value; ±4% of the stated value; ±3% of the stated value; ±2% of the stated value; or ±1% of the stated value.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

The terms "a," "an," "the" and similar referents used in the context of describing implementations (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate implementations of the disclosure and does not pose a limitation on the scope of the disclosure. No language in the specification should be construed as indicating any non-claimed element essential to the practice of implementations of the disclosure.

Groupings of alternative elements or implementations disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain implementations are described herein, including the best mode known to the inventors for carrying out implementations of the disclosure. Of course, variations on these described implementations will become apparent to those of ordinary skill in the art upon reading the foregoing description. The inventors expect skilled artisans to employ such variations as appropriate, and the inventors intend for implementations to be practiced otherwise than specifically described herein. Accordingly, the scope of this disclosure includes all modifications and equivalents of the subject matter recited in the claims appended hereto as permitted by applicable law. Moreover, any combination of the above-described elements in all possible variations thereof is encompassed by implementations of the disclosure unless otherwise indicated herein or otherwise clearly contradicted by context.

What is claimed is:

1. A monitor-defibrillator, comprising:
a detection circuit configured to detect an electrocardiogram (ECG) of an individual;
a discharge circuit configured to output a first electrical shock to the individual at a first time and to output a second electrical shock to the individual at a second time, the second time being after the first time;
a display configured to output a report summarizing the first electrical shock, the first time, the second electrical shock, and the second time; and
a processor configured to:
identify a pre-shock segment of the ECG, the pre-shock segment being before the first time;
determine that the pre-shock segment of the ECG is indicative of a shockable arrhythmia, the shockable arrhythmia comprising ventricular fibrillation (VF) or ventricular tachycardia (VT);
based on determining that the pre-shock segment of the ECG is indicative of the shockable arrhythmia, cause the discharge circuit to output the first electrical shock;
identify a post-shock segment of the ECG, the post-shock segment beginning within ten seconds of the first time and ending before the second time;
determine that the post-shock segment of the ECG is indicative of the shockable arrhythmia temporarily resolving; and
in response to determining that the post-shock segment of the ECG is indicative of the shockable arrhythmia temporarily resolving, cause the discharge circuit to output the second electrical shock at the same vector as the first electrical shock.

2. The monitor-defibrillator of claim 1, wherein the report further summarizes the same vector, the pre-shock segment of the ECG, the post-shock segment of the ECG, the pre-shock segment of the ECG being indicative of the shockable arrhythmia, and the post-shock segment of the ECG being indicative of the shockable arrhythmia temporarily resolving.

3. The monitor-defibrillator of claim 1, the post-shock segment being a first post-shock segment, the same vector being a first vector, wherein the discharge circuit is configured to output a third electrical shock to the individual at a third time; and
wherein the processor is further configured to:
identify a second post-shock segment of the ECG, the second post-shock segment beginning within ten seconds of the second time and ending before the third time;
determine that the second post-shock segment of the ECG is indicative of the shockable arrhythmia failing to resolve; and
in response to determining that the second post-shock segment of the ECG is indicative of the shockable arrhythmia failing to resolve, cause the discharge circuit to output the third electrical shock at a second vector that is different than the first vector.

4. A medical device, comprising:
a detection circuit configured to detect an electrocardiogram (ECG) of an individual; and
a processor configured to:
identify a post-shock segment of the ECG, the post-shock segment beginning within a threshold time period of a first electrical shock being administered to the individual;
determine that the post-shock segment of the ECG is indicative of a non-shockable heart rhythm;
identify a pre-shock segment of the ECG, the pre-shock segment being detected after the post-shock segment and before a second electrical shock is administered to the individual;
determine that the pre-shock segment of the ECG is indicative of a shockable arrhythmia, the shockable arrhythmia comprising ventricular fibrillation (VF) or ventricular tachycardia (VT); and
in response to determining that the post-shock segment of the ECG is indicative of the non-shockable heart rhythm and that the pre-shock segment is indicative of the shockable arrhythmia:
output a report indicating that the arrhythmia has temporarily resolved; or
output a recommendation to administer the second electrical shock at a same shock parameter as the first electrical shock.

5. The medical device of claim 4, wherein the shock parameter comprises an energy level, a voltage amplitude, a vector, a duration, a shape, or an electrode placement.

6. The medical device of claim 4, wherein the threshold time period is between one second and one minute.

7. The medical device of claim 4, wherein the processor is further configured to:
remove a chest compression artifact from the post-shock segment.

8. The medical device of claim 4, wherein the processor is further configured to:
output an instruction to pause administration of chest compressions to the individual between a first time and a second time, and
wherein the post-shock segment of the ECG begins at the first time and ends at the second time.

9. The medical device of claim 4, the post-shock segment being a first post-shock segment, wherein the processor is further configured to:
identify a second post-shock segment of the ECG, the second post-shock segment beginning within one second of the second electrical shock being administered to the individual;
determine that the second post-shock segment of the ECG is indicative of the arrhythmia failing to resolve; and
in response to determining that the second post-shock segment of the ECG is indicative of the arrhythmia failing to resolve:
modify the report to indicate that the arrhythmia has failed to resolve; or
output a recommendation to administer a third electrical shock at a different shock parameter than the same shock parameter of the first electrical shock and the second electrical shock.

10. The medical device of claim 4, wherein the processor is further configured to:
identify a pre-shock segment of the ECG;

determine whether the pre-shock segment of the ECG is indicative of the arrhythmia; and in response to determining whether the pre-shock segment of the ECG is indicative of the arrhythmia, output a report indicating whether the pre-shock segment of the ECG is indicative of the arrhythmia.

11. The medical device of claim 4, further comprising:
a screen configured to visually present the report or the recommendation; or
a transceiver configured to transmit a signal comprising the report or the recommendation to an external device.

12. The medical device of claim 4, further comprising:
a discharge circuit, wherein the processor further configured to cause the discharge circuit to output the second electrical shock in response to determining that the post-shock segment of the ECG is indicative of the non-shockable arrhythmia.

13. A method, comprising:
identifying a post-shock segment of an ECG of an individual, the post-shock segment beginning within a threshold time period of a first electrical shock being administered to the individual;
determining that the post-shock segment of the ECG is indicative of a non-shockable heart rhythm;
identify a pre-shock segment of the ECG, the pre-shock segment being detected after the post-shock segment and before a second electrical shock is administered to the individual;
determine that the pre-shock segment of the ECG is indicative of a shockable arrhythmia, the shockable arrhythmia comprising ventricular fibrillation (VF) or ventricular tachycardia (VT); and
in response to determining that the post-shock segment of the ECG is indicative of the non-shockable heart rhythm and determining that the pre-shock segment is indicative of the shockable arrhythmia:
outputting a report indicating that the arrhythmia has temporarily resolved; or
outputting a recommendation to administer the second electrical shock at a same shock parameter as the first electrical shock.

14. The method of claim 13, wherein the shock parameter comprises an energy level, a voltage amplitude, a vector, a duration, a shape, or an electrode placement.

15. The method of claim 13, wherein the threshold time period is between one second and one minute.

16. The method of claim 13, further comprising:
removing a chest compression artifact from the post-shock segment.

17. The method of claim 13, further comprising:
outputting the second electrical shock.

18. The method of claim 17, further comprising:
receiving an input signal,
wherein outputting the second electrical shock is in response to receiving the input signal.

19. The method of claim 13, the post-shock segment being a first post-shock segment, the method further comprising:
identifying a second post-shock segment of the ECG, the second post-shock segment beginning within one second of the second electrical shock being administered to the individual;
determining that the second post-shock segment of the ECG is indicative of the arrhythmia failing to resolve; and
in response to determining that the second post-shock segment of the ECG is indicative of the arrhythmia failing to resolve:
modifying the report to indicate that the arrhythmia has failed to resolve; or
outputting a recommendation to administer a third electrical shock at a different shock parameter than the same shock parameter of the first electrical shock and the second electrical shock.

20. The method of claim 19, further comprising:
in response to determining that the second post-shock segment of the ECG is indicative of the arrhythmia failing to resolve, outputting the third electrical shock.

* * * * *